(12) United States Patent
DeRosa et al.

(10) Patent No.: US 10,350,861 B2
(45) Date of Patent: Jul. 16, 2019

(54) LAMINATE STRUCTURES WITH ENHANCED DAMPING PROPERTIES

(71) Applicant: CORNING INCORPORATED, Corning, NY (US)

(72) Inventors: Michael Edward DeRosa, Painted Post, NY (US); Jennifer Lynn Lyon, Painted Post, NY (US); James Robert Matthews, Painted Post, NY (US); Michael Lesley Sorensen, Waverly, NY (US); Arlin Lee Weikel, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 172 days.

(21) Appl. No.: 15/219,664

(22) Filed: Jul. 26, 2016

(65) Prior Publication Data

US 2017/0028687 A1  Feb. 2, 2017

Related U.S. Application Data

(60) Provisional application No. 62/199,285, filed on Jul. 31, 2015, provisional application No. 62/339,152, (Continued)

(51) Int. Cl.
*B32B 17/10* (2006.01)
*B32B 7/022* (2019.01)
(Continued)

(52) U.S. Cl.
CPC .......... *B32B 17/10761* (2013.01); *B32B 7/02* (2013.01); *B32B 7/022* (2019.01);
(Continued)

(58) Field of Classification Search
CPC ....... B32B 17/00–17/1099; B32B 7/02; B32B 7/022; C08F 220/00–220/70;
(Continued)

(56) References Cited

U.S. PATENT DOCUMENTS

| 526,223 A | 9/1894 | Field |
|---|---|---|
| 1,098,342 A | 5/1914 | Benedictus |

(Continued)

FOREIGN PATENT DOCUMENTS

| CN | 104610871 | 5/2015 |
|---|---|---|
| EP | 532478 A2 | 3/1993 |

(Continued)

OTHER PUBLICATIONS

"1,6-Hexanediol Diacrylate, 99% (reactive esters), stab. with 90ppm hydroquinone". https://www.alfa.com/en/catalog/043203; Retrieved Jun. 8, 2018.*

(Continued)

*Primary Examiner* — Prashant J Khatri

(57) ABSTRACT

Described herein are laminate structures with enhanced sound-damping properties and mechanical properties. The laminates are composed of an interlayer structure disposed between a first glass substrate and a second glass substrate, wherein the interlayer is composed of a polymer layer designed such that sound attenuation or damping by the laminate is optimized. The laminates described herein may be used in vehicles or architectural panels. In one or more embodiments, the laminate may be disposed in an opening of a vehicle body. Where the vehicle body is an automobile, the laminate could be used as a windshield, a side window, sunroof or rear windshield. The body of some embodiments may include railcar body, or an airplane body. In other embodiments, the laminate may be used in architectural panels, which may include a window, an interior wall panel, (Continued)

a modular furniture panel, a backsplash, a cabinet panel, or an appliance panel.

50 Claims, 10 Drawing Sheets

Related U.S. Application Data filed on May 20, 2016, provisional application No. 62/349,425, filed on Jun. 13, 2016.

(51) Int. Cl.
| | | |
|---|---|---|
| C08L 33/08 | (2006.01) | |
| C08L 33/10 | (2006.01) | |
| C08L 33/14 | (2006.01) | |
| C08F 220/18 | (2006.01) | |
| C08F 220/28 | (2006.01) | |
| C08F 220/30 | (2006.01) | |
| C08F 226/06 | (2006.01) | |
| B64C 1/14 | (2006.01) | |
| B32B 7/02 | (2019.01) | |
| B64C 1/06 | (2006.01) | |
| B64C 1/00 | (2006.01) | |
| B64D 11/00 | (2006.01) | |

(52) U.S. Cl.
CPC .. *B32B 17/10036* (2013.01); *B32B 17/10119* (2013.01); *B32B 17/10137* (2013.01); *B32B 17/10743* (2013.01); *B64C 1/066* (2013.01); *B64C 1/14* (2013.01); *C08F 220/28* (2013.01); *C08F 220/30* (2013.01); *C08F 226/06* (2013.01); *C08L 33/08* (2013.01); *C08L 33/10* (2013.01); *C08L 33/14* (2013.01); *B32B 2250/03* (2013.01); *B32B 2255/26* (2013.01); *B32B 2307/102* (2013.01); *B32B 2307/732* (2013.01); *B32B 2419/00* (2013.01); *B32B 2479/00* (2013.01); *B32B 2509/00* (2013.01); *B32B 2605/00* (2013.01); *B32B 2607/00* (2013.01); *B64C 1/00* (2013.01); *B64C 2001/0072* (2013.01); *B64D 2011/0046* (2013.01); *C08F 220/18* (2013.01); *C08F 2220/1875* (2013.01); *C08F 2220/282* (2013.01); *C08F 2220/285* (2013.01); *C08F 2220/301* (2013.01); *Y02T 50/43* (2013.01); *Y02T 50/46* (2013.01); *Y10T 428/2495* (2015.01); *Y10T 428/24967* (2015.01)

(58) Field of Classification Search
CPC ...... C08F 226/00–226/12; C08L 33/14; C08L 33/08; C08L 33/10; Y10T 428/2495; Y10T 428/24967
See application file for complete search history.

(56) References Cited

U.S. PATENT DOCUMENTS

| | | | |
|---|---|---|---|
| 4,609,718 A | 9/1986 | Bishop et al. | |
| 4,629,287 A | 12/1986 | Bishop | |
| 4,690,502 A | 9/1987 | Zimmerman et al. | |
| 4,737,410 A * | 4/1988 | Kantner | C09J 133/062 428/343 |
| 4,798,852 A | 1/1989 | Zimmerman et al. | |
| 5,262,232 A | 11/1993 | Wilfong et al. | |
| 5,308,887 A | 5/1994 | Ko et al. | |
| 5,453,450 A * | 9/1995 | Kinzer | C09J 4/00 522/170 |
| 5,502,145 A | 3/1996 | Szum | |
| 5,602,221 A * | 2/1997 | Bennett | C08F 220/18 526/307.7 |
| 5,670,006 A | 9/1997 | Wilfong et al. | |
| 5,696,179 A | 12/1997 | Chawla | |
| 5,744,557 A | 4/1998 | McCormick et al. | |
| 5,851,327 A | 12/1998 | Landin | |
| 5,856,022 A | 1/1999 | MCormick et al. | |
| 5,863,664 A | 1/1999 | McCormick et al. | |
| 5,902,836 A * | 5/1999 | Bennett | C08F 2/48 522/8 |
| 6,069,214 A | 5/2000 | McCormick et al. | |
| 6,069,219 A | 5/2000 | McCormick et al. | |
| 6,074,732 A | 6/2000 | Garnier et al. | |
| 6,119,807 A | 9/2000 | Benson, Jr. et al. | |
| 6,126,865 A | 10/2000 | Haak et al. | |
| 6,132,882 A | 10/2000 | Landin et al. | |
| 6,251,493 B1 | 6/2001 | Johnson et al. | |
| 6,298,189 B1 | 10/2001 | Szum et al. | |
| 6,432,522 B1 | 8/2002 | Friedman et al. | |
| 6,528,553 B1 * | 3/2003 | Komiya | C03C 25/1055 428/378 |
| 6,821,629 B2 | 11/2004 | Garnier et al. | |
| 6,849,333 B2 | 2/2005 | Schissel et al. | |
| 7,018,700 B2 | 3/2006 | Park | |
| 7,121,380 B2 | 10/2006 | Garnier et al. | |
| 7,166,649 B2 * | 1/2007 | Day | C08G 18/672 522/96 |
| 7,226,955 B2 | 6/2007 | Subramonian et al. | |
| 7,276,543 B2 | 10/2007 | Bishop et al. | |
| 7,764,855 B2 | 7/2010 | Roba et al. | |
| 7,799,840 B2 | 9/2010 | Wheeler et al. | |
| 7,829,192 B2 | 11/2010 | Boure et al. | |
| 7,892,629 B2 | 2/2011 | Rehfeld et al. | |
| 7,973,106 B2 | 7/2011 | Fisk et al. | |
| 8,092,919 B2 | 1/2012 | Lee et al. | |
| 8,242,185 B2 | 8/2012 | Smith et al. | |
| 8,328,273 B2 | 12/2012 | Baroggi et al. | |
| 8,541,504 B2 | 9/2013 | Kusanose et al. | |
| 8,663,811 B2 | 3/2014 | Everaerts et al. | |
| 8,686,060 B2 | 4/2014 | Smith et al. | |
| 8,691,911 B2 | 4/2014 | Doshi et al. | |
| 8,986,072 B2 | 3/2015 | Darcangelo et al. | |
| 9,102,122 B2 | 8/2015 | Rehfeld et al. | |
| 9,464,151 B2 | 10/2016 | Hood et al. | |
| 2001/0044023 A1 | 11/2001 | Johnson et al. | |
| 2005/0196608 A1 * | 9/2005 | Wouters | C09J 133/02 428/355 R |
| 2007/0122629 A1 | 5/2007 | Chen et al. | |
| 2008/0039546 A1 * | 2/2008 | Futami | C08F 220/18 522/182 |
| 2008/0207829 A1 | 8/2008 | Hofmann et al. | |
| 2008/0272513 A1 | 11/2008 | Stenzel | |
| 2011/0135269 A1 | 6/2011 | Kim et al. | |
| 2012/0094084 A1 | 4/2012 | Fisher et al. | |
| 2012/0128313 A1 | 5/2012 | Wu et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0287980 A1 * | 10/2013 | Burdzy | C09J 4/06 428/35.7 |
| 2013/0295357 A1 * | 11/2013 | Cleary | B32B 17/10036 428/215 |
| 2013/0319046 A1 | 12/2013 | Cleary et al. | |
| 2013/0323415 A1 | 12/2013 | Brackley et al. | |
| 2013/0323521 A1 | 12/2013 | Xia et al. | |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0239034 A1 | 8/2014 | Cleary et al. | |
| 2014/0262002 A1 | 9/2014 | Suwa et al. | |
| 2014/0349054 A1 | 11/2014 | Wu | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0114558 A1 * | 4/2015 | Ellringmann | B41N 6/02 156/332 |

(56) References Cited

U.S. PATENT DOCUMENTS

| | | |
|---|---|---|
| 2015/0122406 A1 | 5/2015 | Fisher et al. |
| 2015/0132538 A1 | 5/2015 | Cleary et al. |
| 2015/0140301 A1 | 5/2015 | Fisher et al. |
| 2015/0158275 A1 | 6/2015 | D'Errico et al. |
| 2015/0158277 A1 | 6/2015 | Fisher et al. |
| 2015/0158986 A1 | 6/2015 | Xu et al. |
| 2015/0232366 A1 | 8/2015 | Fredholm et al. |
| 2015/0232367 A1 | 8/2015 | Joubaud et al. |
| 2015/0251377 A1 | 9/2015 | Cleary et al. |
| 2015/0259491 A1 | 9/2015 | LiPiShan et al. |
| 2015/0274571 A1 | 10/2015 | Brennan et al. |
| 2015/0321940 A1 | 11/2015 | Dannoux et al. |
| 2015/0353785 A1 | 12/2015 | Lewandowski et al. |
| 2016/0082705 A1 | 3/2016 | Fisher et al. |
| 2016/0159039 A1* | 6/2016 | Lu ............... B32B 17/10605 428/437 |
| 2016/0207290 A1 | 7/2016 | Cleary et al. |
| 2016/0207819 A1 | 7/2016 | Cleary et al. |
| 2016/0207820 A1 | 7/2016 | Cleary et al. |
| 2016/0250825 A1 | 9/2016 | Cleary et al. |

FOREIGN PATENT DOCUMENTS

| | | |
|---|---|---|
| EP | 572077 | 12/1993 |
| EP | 2281860 | 9/2011 |
| JP | 2000177381 | 6/2000 |
| JP | 2015078255 A | 4/2015 |
| JP | 2015145464 A | 8/2015 |
| KR | 2014134050 | 11/2014 |
| KR | 2015092510 A | 8/2015 |
| WO | 1994017005 | 8/1984 |
| WO | 2003078536 A2 | 9/2003 |
| WO | 2010027041 | 3/2010 |
| WO | 2014058163 | 4/2014 |
| WO | 2015009494 | 1/2015 |
| WO | 2015041324 A1 | 3/2015 |

OTHER PUBLICATIONS

"Product Specification: Isooctyl Acrylate". Sigma-Aldrich. Retrieved Jan. 3, 2018.*

International Search Report and Written Opinion PCT/US2016/044250 dated Mar. 30, 2017.

Hartmann, Loss Factor Height and Width Limits for Polymer Relaxations, J. Acoust. Soc. Am., vol. 95, No. 1, Jan. 1994, pp. 226-233.

Hartmann, B Relation of polymer chemical composition to acoustic damping, Sound and Vibration Damping with Polymer, ACS sym Ser vol. 424 Chapter 2.

ASTM Standard C770-98 2013 Glass Stress-Optical, 8 pages.

Hedgbeth; "A Clear View: History of Automotive Saftey Glass"; Second Change Garage; Downloaded Jan. 23, 2017; 11 pages; http://www.secondchancegarage.com/public/windshield-history.cfm.

Invitation to Pay Additional Fees; PCT/US2016/044250; dated Nov. 8, 2016; 6 Pages; European Patent Office.

* cited by examiner

LAMINATE STRUCTURES WITH ENHANCED DAMPING PROPERTIES

CROSS-REFERENCE TO RELATED APPLICATIONS

This application claims the benefit of priority under 35 U.S.C. § 119 of U.S. Provisional Application Ser. No. 62/199,285 filed on Jul. 31, 2015, U.S. Provisional Application Ser. No. 62/339,152, filed on May 20, 2016, and U.S. Provisional Application Ser. No. 62/349,425, filed on Jun. 13, 2016, the contents of which are relied upon and incorporated herein by reference in their entirety.

BACKGROUND

Acoustic performance of lighter window laminates is below that of thicker laminates of equivalent construction, which permits the passage of sound and noise through the laminate. The frequency of this sound or noise occurs from approximately 1,000 Hz to 10,000 Hz. This is relevant for vehicle windows, as this sound or noise is in the range of human speech and is very prominent and distracting to passengers. Therefore, it is desirable to have a material that will absorb and dissipate mechanical frequencies in this range so that external sound or noise can be attenuated.

Efforts have been made to address noise attenuation. For example, improved noise attenuation has been achieved with an acoustic grade of polyvinyl butyral PVB. Acoustic PVB (APVB) consists of three layers of material: two outer layers of standard PVB (SPVB) and a core layer of PVB in the middle that is plasticized with triethylene glycol bis-2-ethylhexanoate. However, even acoustic grade of PVB is not sufficient for some window laminate designs and therefore even greater noise attenuation is needed.

In many transportation applications, fuel economy is a function of vehicle weight. It is desirable, therefore, to reduce the weight of laminates for such applications without compromising their strength and sound-attenuating properties. In view of the foregoing, thinner laminates that possess or exceed the sound-damping, durability, and breakage performance properties associated with thicker, heavier laminates are desirable.

SUMMARY

Described herein are laminate structures with enhanced sound-damping properties and mechanical properties. The laminates are composed of an interlayer structure disposed between a first glass substrate and a second glass substrate, wherein the interlayer is composed of a polymer layer designed to optimize sound attenuation or damping. The laminates described herein may be used in vehicles, architectural panels or any application that requires high strength but lightweight windows, which also dampen or attenuate sound in the desirable frequency range. In one or more embodiments, the laminate may be disposed in an opening of a vehicle body. Where the vehicle body is an automobile, the laminate could be used as a windshield, a side window, a sunroof, or a rear windshield. The vehicle body of some embodiments may include a railcar, an aircraft, or seacraft. In other embodiments, the laminate may be used in architectural panels, which may include a window, an interior wall panel, a modular furniture panel, a backsplash, a cabinet panel, or an appliance panel.

A first aspect of this disclosure pertains to a laminate comprising a first substrate, an interlayer structure and a second substrate where the interlayer structure is disposed between the first and second substrates. In one or more embodiments, the interlayer structure comprises a first polymer. In one or more embodiments, the interlayer structure comprises a first layer comprising the first polymer, wherein the first layer is disposed between a second layer and a third layer. In some embodiments, the second layer and the third layer comprise the same polymeric material. In some embodiments, the second layer and the third layer comprise different polymeric materials from one another. In one or more embodiments, either one or both of the second layer and the third layer comprise a polymeric material selected from the group consisting of polyvinyl butyral (PVB), ethylene-vinyl acetate (EVA) and thermoplastic polyurethane (TPU), polyester (PE), and polyethylene terephthalate (PET). In one or more specific embodiments, the second layer and the third layer comprise polyvinyl butyral (PVB).

In one or more embodiments, the first polymer comprises a tan δ value greater than 1.0 at a temperature a range from about −20° C. to about 40° C. and a frequency in a range from about 1 Hz to about 20,000 Hz. In some embodiments, the first polymer comprises a tan δ value greater than 1.0 at a temperature in a range from about −20° C. to about 40° C. when measured at mechanical frequency of 1 Hz and a heating rate of 2° C./minute. In one or more embodiments, the first polymer comprises a glass transition temperature, as indicated by a peak in tan δ, in a range from about 0° C. to about −20° C. at a mechanical frequency of 1 Hz with a heating rate of 2° C./minute. In some embodiments, the first polymer comprises a tan δ value greater than 1.0 at a temperature of 20° C. at a frequency in a range from about 1,000 Hz to about 20,000 Hz. In one or more embodiments, the first polymer exhibits a tan δ value greater than 2.0 or from about 2.0 to about 4.0, at a temperature in a range from about −20° C. to about 40° C. when measured at mechanical frequency of 1 Hz and a heating rate of 2° C./min. In one or more embodiments, the first polymer comprises a tan δ value in a range from about 2.0 to about 4.0 at a temperature in a range from about −20° C. to about 40° C. and at a frequency in a range from about 1,000 Hz to about 10,000 Hz. In one or more embodiments, the first polymer has a tan δ value greater than 1.25 at all temperatures in a range from −20° C. to about 40° C. and at all frequencies in a range from about 100 Hz to about 100,000 Hz.

In some embodiments, the first polymer may be described with respect to a known acoustic PVB material having a core layer, or more specifically to that core material. For example, in one or more embodiments, the first polymer as having a tan δ value greater than the core layer of acoustic PVB within a frequency range of 1 Hz to 20,000 Hz. In some instances, the first polymer has a tan δ value that is 1.2 to 4 times greater than the core layer of acoustic PVB within a frequency range of 1,000 Hz to 20,000 Hz.

In one or more embodiments, the first polymer is produced by the polymerization of one or more ethylenically unsaturated compounds. In some instances, the first polymer is produced by the polymerization of one or more monomers comprising an allyl compound, a vinyl compound, an acrylate, a methacrylate, an acrylamide, or a methacrylamide, or any combination thereof. In some examples, the first polymer is the polymerization product of two or more acrylate monomers. In one or more embodiments, the first polymer is the polymerization product of phenoxyethylacrylate and ethoxylated(8)nonylphenol acrylate. In one or more embodiments, the first polymer is the polymerization product of phenoxyethylacrylate and phenoxyethoxyethylacrylate.

In one or more embodiments, the first polymer is further at least partially crosslinked with a crosslinking agent. Exemplary crosslinking agents include a diacrylate compound or dimethacrylate compound. Other exemplary crosslinking agents include a polyalkylene oxide diacrylate compound or a polyalkylene oxide dimethacrylate compound. In one or more embodiments, the crosslinking agent is an oligo-propylene glycol diacrylate.

The first and second substrates used in the embodiments of the laminate described herein may further be characterized. In this disclosure, when the laminate is used in a vehicle body, the first substrate may face the exterior of the vehicle body and the second substrate may face the interior of the vehicle body or vice versa (i.e., the first substrate may face the interior of the vehicle body and the second substrate may face the exterior of the vehicle body). When the laminate is used in architectural panels such as a window, the first substrate may face the exterior of the building or the exterior environment, and the second substrate may face the interior of the building or the interior environment or vice versa (i.e., the first substrate may face the interior of the building or the interior environment, and the second substrate may face the exterior of the building or the exterior environment). When the laminate is used in architectural panels such as a modular furniture, a backsplash, a cabinet panel or an appliance panel, the first substrate may face away from a user, and the second substrate may face the user or vice versa (i.e., the first substrate may face the user, and the second substrate may face away from the user).

In one or more embodiments, the first substrate has a thickness of 2.1 mm or less. In one or more embodiments, the first substrate has a thickness in the range from about 1.6 mm to about 4 mm. In one or more embodiments, the first substrate is an unstrengthened glass and may optionally comprise soda lime glass. In one or more embodiments, the first substrate may comprise a strengthened glass. In one or more embodiments, second substrate has a thickness less than the thickness of the first substrate. In some embodiments, the second substrate is a strengthened glass, which may comprise a compressive stress in the range from about 50 MPa to about 800 MPa and a depth of compression in the range from about 35 micrometers to about 200 micrometers. In one or more embodiments, the first substrate has a thickness and the ratio of the thickness of the second substrate to the thickness of the first substrate is greater than about 0.33, or is about 0.39 or greater, or is about 0.5 or greater.

The laminate and/or any one or more components thereof (i.e., the first substrate, the second substrate, the interlayer structure, the first polymer, the first layer, the second layer and the third layer) may be characterized as transparent. For example, the laminate and/or any one or more components thereof (i.e., the first substrate, the second substrate, the interlayer structure, the first polymer, the first layer, the second layer and the third layer) may exhibit a transmittance of greater than 80% in the range of 400 to 700 nm at a thickness of a 1 mm. The transmittance may be measured under a CIE illuminant, such as D65, or F02.

The embodiments of the laminates described herein may be described in terms of sound transmission loss. In one or more embodiments, the laminate has a sound transmission loss of transmission loss of greater than about 38 dB over a frequency range from about 2500 Hz to about 6000 Hz.

A second aspect of this disclosure pertains to a vehicle comprising a body, an opening and a laminate (according to one or more embodiments disclosed herein) disposed in the opening. In one or more embodiments, the vehicle body comprises an automobile, a railcar, aircraft or seacraft.

A third aspect of this disclosure pertains to an architectural panel comprising the laminate (according to one or more embodiments disclosed herein). In one or more embodiments, the architectural panel comprises a window, an interior wall panel, a modular furniture panel, a backsplash, a cabinet panel, or an appliance panel.

A Fourth aspect of this disclosure pertains to a polymer comprising a polymerization product of one or more ethylenically unsaturated compounds. In one or more embodiments, the polymer is produced by the polymerization of one or more monomers comprising an allyl compound, a vinyl compound, an acrylate, a methacrylate, an acrylamide, or a methacrylamide, or any combination thereof. In some embodiments, the polymer is the polymerization product of two or more acrylate monomers. In one or more embodiments, the polymer is the polymerization product of phenoxyethylacrylate and ethoxylated(8)nonylphenol acrylate. In one or more embodiments, the first polymer is the polymerization product of phenoxyethylacrylate and phenoxyethoxyethylacrylate.

In one or more embodiments, the polymer is at least partially crosslinked with a crosslinking agent. In one specific embodiment, the crosslinking agent is a diacrylate compound or dimethacrylate compound. In another specific embodiment, the crosslinking agent is a polyalkylene oxide diacrylate compound or a polyalkylene oxide dimethacrylate compound. In yet another specific embodiment, the crosslinking agent is an oligo-propylene glycol diacrylate.

A fifth aspect of this disclosure pertains to a laminate comprising an interlayer structure (according to one or more embodiments described herein) disposed between a first substrate and a second substrate, wherein the first polymer is produced by the polymerization of one or more ethylenically unsaturated compounds, wherein the laminate exhibits a sound transmission loss of greater than about 38 dB over a frequency range from about 2500 Hz to about 6000 Hz. The first polymer may be produced by the polymerization of one or more monomers comprising an allyl compound, a vinyl compound, an acrylate, a methacrylate, an acrylamide, or a methacrylamide, or any combination thereof. The first polymer may include the polymerization product of two or more acrylate monomers. The first polymer may optionally include the polymerization product of phenoxyethylacrylate and ethoxylated(8)nonylphenol acrylate. In one or more embodiments, the first polymer is the polymerization product of phenoxyethylacrylate and phenoxyethoxyethylacrylate.

In one or more embodiments, the first polymer may be at least partially crosslinked with a crosslinking agent (such as those described herein).

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one

DETAILED DESCRIPTION

Figure 1:
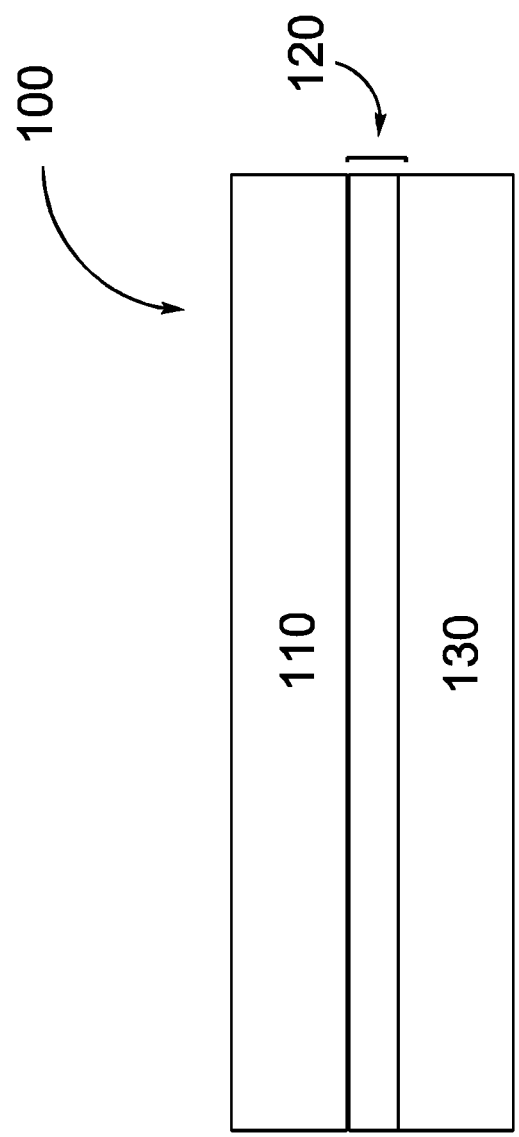
FIG. 1 is a side view of an exemplary laminate described herein.

Before the present articles and methods are disclosed and described, it is to be understood that the aspects described below are not limited to specific devices or methods, or uses as such may, of course, vary. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "a monomer" includes one or more monomers.

As used herein, the term "about" provides flexibility to a numerical range endpoint by providing that a given value may be "a little above" or "a little below" the endpoint without affecting the desired result. Ranges may be expressed herein from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

Optional other "about" language: Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about." As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, the term "dispose" includes placing or stacking a material onto a surface using any known method in the art. The disposed material may constitute a substrate, an interlayer, an interlayer structure or a layer, as used herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a substrate, an interlayer, an interlayer structure or a layer, as used herein.

The term "alkyl group" as used herein is a branched or unbranched saturated hydrocarbon group of 1 to 25 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. Examples of longer chain alkyl groups include, but are not limited to, an oleate group or a palmitate group. A "lower alkyl" group is an alkyl group containing from one to eight carbon atoms.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "alkylene group" as used herein is represented by the general formula $-(CH_2)_m-$, where m is from 1 to 10.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

Each component used to prepare the laminates described herein as well as methods of making and using the laminates is described below.

Interlayer Structure

FIG. 1 provides an example of a laminate structure described herein. Laminate structure 100 has an interlayer structure 120 disposed between a first substrate 110 and a second substrate 130. In one or more embodiments, the interlayer structure 120 in FIG. 1 comprises a single polymer layer composed of a first polymer described herein.

Figure 2:
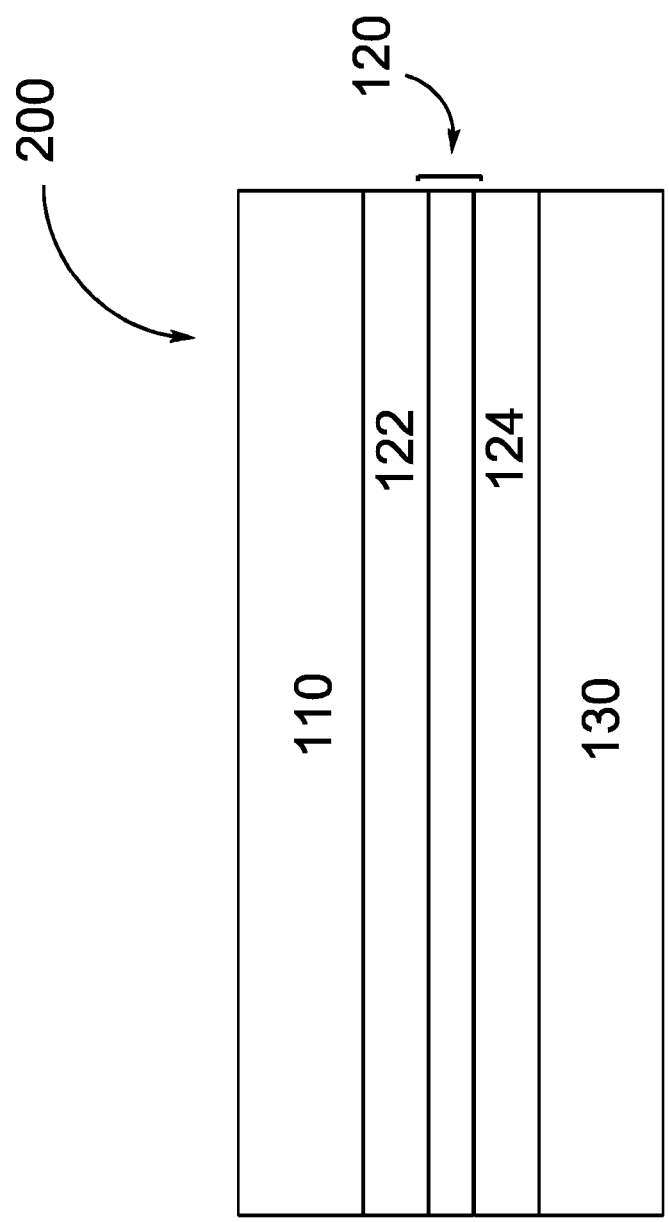
FIG. 2 is a side view of an exemplary laminate described herein.

In one or more embodiments, the interlayer structure can be composed of two or more layers. An example of this is depicted in FIG. 2. Referring to FIG. 2, the interlayer structure comprises layers 120, 122, and 124, where first layer 120 comprises a first polymer described herein, and is disposed between second and third layers 122 and 124, respectively. The second and third layers 122 and 124 can be made of the same or different material as one another. In one or more embodiments, any one or both the second and third layers 122 and 124 may have the same or different material as the first layer. In some embodiments, all three of the first, second and third layers 120, 122, 124 may comprise the same first polymer as described herein but may have different properties from any one or more of the other layers. Additionally, the second and third layers 122, 124 can have the same or different thickness. In one or more embodiments, the second and third layers 122, 124 are composed of polyvinyl butyral (PVB), ethylene-vinyl acetate (EVA), a thermoplastic polyurethane (TPU), a polyester (PE), or polyethylene terephthalate (PET). In some other embodiments, the second and third layers 122, 124 are each composed of polyvinyl butyral (PVB). In one or more embodiments, the interlayer structure or the individual layers (and/or any sub-layers) of the interlayer structure may include any one or more of pigments, UV absorbers, infrared absorbers, adhesion promoting silane compounds, or other stabilizers.

In one or more embodiments, the first polymer is composed of a material that has a tan delta ($\delta$) value greater than that of the core layer present in known APVB in the frequency range of interest and the temperature range of interest. By increasing the tan $\delta$ value of the first polymer, the damping properties of a laminate incorporating such first polymer also increase. In addition to the tan $\delta$ value being greater than that of the core layer of currently available APVB, the storage shear modulus (G') value of the first polymer described herein is ideally equivalent to or less than that of the core layer of the APVB in the frequency range of interest at the temperature of interest. As demonstrated in the Examples, acoustic modeling results indicate that a laminate including an interlayer structure as described herein using a first polymer described herein exhibits significantly improved noise attenuation over an identical laminate that utilizes a known APVB material in the desired frequency range at the temperature of interest. Here, the tan $\delta$ value of the first polymer was significantly higher than the core layer present in APVB.

A rheometer can be used to quantify the dynamic mechanical shear properties of the first polymer that is ultimately used to calculate the tan $\delta$ value. Using a parallel plate configuration the rheometer measures the elastic portion of the viscoelastic response, storage shear modulus (G'), and the viscous portion of the response, loss shear modulus (G") during sinusoidal oscillatory shear deformation. Both G' and G" change significantly as a function of frequency and temperature. The ratio G"/G' is called tan $\delta$ and is a measure of the damping behavior of the material.

There are other considerations when selecting the components used to produce the first polymer useful herein possessing high tan $\delta$ values. Not wishing to be bound by theory, the first polymer should be composed of a network that is as uniform as possible. This can be accomplished achieved by using the fewest number of different monomers as possible to produce the first polymer while still maximizing the peak tan $\delta$ at the desired frequency and temperature of operation. Therefore, monomers can be selected such that they have peak tan $\delta$ of their cured homo-polymers that are at frequencies as close as possible to the desired final value. Mixtures are then made from these monomers to create a combined composition, whose peak tan $\delta$ after curing is at the correct frequency. By selecting monomers that have homo-polymers with peak tan $\delta$ as close as possible to the desired frequency, the first polymer can be produced substantially from one single monomer, but can include additional monomers if necessary to shift the peak tan $\delta$ to the correct frequency. In one aspect, the monomers selected to produce the first polymer possess structures are as close to each other as possible so as to reduce deviation from a uniform network once polymerized.

Another consideration when selecting the monomers to produce the first polymer is the miscibility of the monomers. The monomers should all be miscible with each other. The monomers should not preferentially segregate during the polymerization process, but instead react with one another as equally as possible in their relative proportions to produce a uniform a network. As well as monomer miscibility, the cured polymer network and partially cured network fragments should not phase separate from the whole in order to maintain the closest possible adherence to network uniformity.

The viscosity of the monomer(s) prior to polymerization is another feature to consider when selecting the monomers to produce the first polymer. Different viscosity ranges lend themselves better to different processing conditions. For example, low viscosity materials flow more easily and de-air more quickly. However, higher viscosity materials are more easily manipulated into films where they are required to maintain film thickness for a period of time before polymerization. In certain aspects, viscosity modifiers such as, for example, polymeric materials, can be combined with the monomer(s) in order to adjust viscosity, performance and other related properties. For example, the polymer selected can provide a film that meets the desired use requirements for clarity and temperature performance that is also miscible or compatible with the monomer(s). In one aspect, the final viscosity of the monomer(s) (with or without viscosity modifier) prior to polymerization is from 10 cPs to 20,000 cPs. In another aspect, the monomer mixture has a viscosity of from 100 cPs to 5,000 cPs, 150 cPs to 4,000, or 200 cPs to 3,000 cPs.

Other factors to consider include surface tension and surface chemistry. The selection of the monomers for producing the first polymer can be varied depending upon the degree of wetting of the surface the monomers are applied to. For example, the pre-cured monomer mixture can wet a surface to a greater or lesser extent. Alternatively, the monomer mixture can wet one surface preferentially over another. It may also be necessary for the cured polymer composition to adhere or not adhere to a given surface. Additives such as surface tension modifiers can be incorporated into the monomer mixture to modify the surface tension properties. Examples of surface tension modifiers include, but are not limited to, surfactants and adhesion promoters, such as silanes for glass or other hydroxylated inorganic surfaces, or acids or bases to create ionic interactions. Where additives are used, they were used at levels small enough to provide minimal disruption to the uniformity of the polymer network. Here the additives preferentially segregate to the surfaces to have maximum effect at the interface with minimum impact on the bulk.

The first polymers described herein possess very high tan δ values when measured in the frequency range audible to human beings at a temperature within a range of operation. For example, such tan δ values may be greater than 1, about 1.2 or greater, about 1.4 or greater, about 1.6 or greater, about 1.8 or greater, about 2 or greater, about 2.2 or greater, about 2.4 or greater, about 2.6 or greater, about 2.8 or greater, about 3 or greater, about 3.2 or greater, about 3.4 or greater, about 3.5 or greater, or about 4 or greater. The upper limit of the tan δ value may be about 5, or about 4.5. In some embodiments, the tan δ value may be in a range from about 1.1 to about 4, from about 1.2 to about 4, from about 1.4 to about 4, from about 1.5 to about 4, from about 1.6 to about 4, from about 1.8 to about 4, from about 2 to about 4, from about 2.2 to about 4, from about 2.4 to about 4, from about 2.5 to about 4, from about 2.6 to about 4, from about 2.8 to about 4, from about 3 to about 4, from about 1.1 to about 3.8, from about 1.1 to about 3.6, from about 1.1 to about 3.5, from about 1.1 to about 3.4, from about 1.1 to about 3.2, from about 1.1 to about 3, from about 1.5 to about 4, from about 1.5 to about 3.5, or from about 2 to about 3.5.

In one or more embodiments, the first polymer may exhibit the tan δ values provided herein at a temperature in a range from about −20° C. to about 40° C. In some embodiments, the first polymer may exhibit the tan δ values provided herein a temperature in a range from about −18° C. to about 40° C., from about −16° C. to about 40° C., from about −15° C. to about 40° C., from about −14° C. to about 40° C., from about −12° C. to about 40° C., from about −10° C. to about 40° C., from about −8° C. to about 40° C., from about −6° C. to about 40° C., from about −5° C. to about 40° C., from about −4° C. to about 40° C., from about −2° C. to about 40° C., from about 0° C. to about 40° C., from about −20° C. to about 38° C., from about −20° C. to about 36° C., from about −20° C. to about 35° C., from about −20° C. to about 34° C., from about −20° C. to about 32° C., from about −20° C. to about 30° C., from about −20° C. to about 28° C., from about −20° C. to about 26° C., from about −20° C. to about 25° C., from about −20° C. to about 24° C., from about −20° C. to about 22° C., from about −20° C. to about 20° C., from about −20° C. to about 18° C., from about −20° C. to about 16° C., from about −20° C. to about 15° C., from about −20° C. to about 14° C., from about −20° C. to about 12° C., from about −20° C. to about 10° C., from about −15° C. to about 5° C., or from about −5° C. to about 5° C., and all ranges and sub-ranges therebetween.

In some embodiments, the first polymer exhibits the tan δ values provided herein at all temperatures along the range from about −20° C. to about 40° C., from about −18° C. to about 40° C., from about −16° C. to about 40° C., from about −15° C. to about 40° C., from about −14° C. to about 40° C., from about −12° C. to about 40° C., from about −10° C. to about 40° C., from about −8° C. to about 40° C., from about −6° C. to about 40° C., from about −5° C. to about 40° C., from about −4° C. to about 40° C., from about −2° C. to about 40° C., from about 0° C. to about 40° C., from about −20° C. to about 38° C., from about −20° C. to about 36° C., from about −20° C. to about 35° C., from about −20° C. to about 34° C., from about −20° C. to about 32° C., from about −20° C. to about 30° C., from about −20° C. to about 28° C., from about −20° C. to about 26° C., from about −20° C. to about 25° C., from about −20° C. to about 24° C., from about −20° C. to about 22° C., from about −20° C. to about 20° C., from about −20° C. to about 18° C., from about −20° C. to about 16° C., from about −20° C. to about 15° C., from about −20° C. to about 14° C., from about −20° C. to about 12° C., from about −20° C. to about 10° C., from about −15° C. to about 5° C., or from about −5° C. to about 5° C. In some embodiments, the first polymer exhibits the tan δ values provided herein at all temperatures along more extreme temperature range combinations, for example, at all temperatures from about −20° C. to about −15° C. and at all temperatures from about −5° C. to about 5° C., and all ranges and sub-ranges therebetween.

In one or more embodiments, the first polymer may exhibit the tan δ values provided herein at a frequency within a range from about 1 Hz to about 20,000 Hz. In one or more embodiments, the frequency at which the first polymer exhibits the tan δ values provided herein is in the range from about 5 Hz to about 100,000 Hz, from about 10 Hz to about 100,000 Hz, from about 100 Hz to about 100,000 Hz, from about 500 Hz to about 100,000 Hz, from about 1,000 Hz to about 100,000 Hz, from about 2,000 Hz to about 100,000 Hz, from about 3,000 Hz to about 100,000 Hz, from about 4,000 Hz to about 100,000 Hz, from about 5,000 Hz to about 100,000 Hz, from about 6,000 Hz to about 100,000 Hz, from about 7,000 Hz to about 100,000 Hz, from about 8,000 Hz to about 100,000 Hz, from about 9,000 Hz to about 100,000 Hz, from about 10,000 Hz to about 100,000 Hz, from about 15,000 Hz to about 100,000 Hz, from about 20,000 Hz to about 100,000 Hz, from about 25,000 Hz to about 100,000 Hz, from about 30,000 Hz to about 100,000 Hz, from about 40,000 Hz to about 100,000 Hz, from about 50,000 Hz to about 100,000 Hz, from about 5 Hz to about 90,000 Hz, from about 5 Hz to about 80,000 Hz, from about 5 Hz to about 70,000 Hz, from about 5 Hz to about 60,000 Hz, from about 5 Hz to about 50,000 Hz, from about 5 Hz to about 40,000 Hz, from about 5 Hz to about 30,000 Hz, from about 5 Hz to about 20,000 Hz, from about 5 Hz to about 18,000 Hz, from about 5 Hz to about 16,000 Hz, from about 5 Hz to about 15,000 Hz, from about 5 Hz to about 14,000 Hz, from about 5 Hz to about 12,000 Hz, from about 5 Hz to about 10,000 Hz, from about 5 Hz to about 5,000 Hz, or from about 5 Hz to about 1,000 Hz, and all ranges and sub-ranges therebetween.

In one or more embodiments, the first polymer may exhibit the tan δ values provided herein at all frequencies within a range from about 1 Hz to about 20,000 Hz, from about 5 Hz to about 100,000 Hz, from about 10 Hz to about 100,000 Hz, from about 100 Hz to about 100,000 Hz, from about 500 Hz to about 100,000 Hz, from about 1,000 Hz to about 100,000 Hz, from about 2,000 Hz to about 100,000 Hz, from about 3,000 Hz to about 100,000 Hz, from about 4,000 Hz to about 100,000 Hz, from about 5,000 Hz to about 100,000 Hz, from about 6,000 Hz to about 100,000 Hz, from about 7,000 Hz to about 100,000 Hz, from about 8,000 Hz to about 100,000 Hz, from about 9,000 Hz to about 100,000 Hz, from about 10,000 Hz to about 100,000 Hz, from about 15,000 Hz to about 100,000 Hz, from about 20,000 Hz to about 100,000 Hz, from about 25,000 Hz to about 100,000 Hz, from about 30,000 Hz to about 100,000 Hz, from about 40,000 Hz to about 100,000 Hz, from about 50,000 Hz to about 100,000 Hz, from about 5 Hz to about 90,000 Hz, from about 5 Hz to about 80,000 Hz, from about 5 Hz to about 70,000 Hz, from about 5 Hz to about 60,000 Hz, from about 5 Hz to about 50,000 Hz, from about 5 Hz to about 40,000 Hz, from about 5 Hz to about 30,000 Hz, from about 5 Hz to about 20,000 Hz, from about 5 Hz to about 18,000

Hz, from about 5 Hz to about 16,000 Hz, from about 5 Hz to about 15,000 Hz, from about 5 Hz to about 14,000 Hz, from about 5 Hz to about 12,000 Hz, from about 5 Hz to about 10,000 Hz, from about 5 Hz to about 5,000 Hz, or from about 5 Hz to about 1,000 Hz, and all ranges and sub-ranges therebetween.

In one or more embodiments, the first polymer has a tan δ value greater than 1.0 or greater than about 1.25 at a temperature in a range from about −20° C. to about 40° C. and at a frequency in a range from about 1 Hz to about 20,000 Hz. In one or more embodiments, the first polymer has a tan δ value greater than 1.0 or greater than about 1.25 at a temperature in a range from about −20° C. to about 40° C. and at a frequency in a range from about 100 Hz to about 100,000 Hz. In one or more embodiments, the first polymer has a tan δ value greater than 1.0 or greater than about 1.25 at a temperature in a range from about −20° C. to about 5° C. and at a frequency in a range from about 100 Hz to about 100,000 Hz. In one or more embodiments, the first polymer has a tan δ value greater than 1.0 or greater than about 1.25 at a temperature in a range from about −15° C. to about 5° C. and at a frequency in a range from about 100 Hz to about 100,000 Hz.

In one or more embodiments, the first polymer has a tan δ value greater than 1.0 or greater than about 1.25 at all temperatures in a range from about −20° C. to about 40° C. and at all frequencies in a range from about 1 Hz to about 20,000 Hz. In one or more embodiments, the first polymer has a tan δ value greater than 1.0 or greater than about 1.25 at all temperatures in a range from about −20° C. to about 40° C. and at all frequencies in a range from about 100 Hz to about 100,000 Hz. In one or more embodiments, the first polymer has a tan δ value greater than 1.0 or greater than about 1.25 at all temperatures in a range from about −20° C. to about 5° C. and at all frequencies in a range from about 100 Hz to about 100,000 Hz. In one or more embodiments, the first polymer has a tan δ value greater than 1.0 or greater than about 1.25 at all temperatures in a range from about −15° C. to about 5° C. and at all frequencies in a range from about 100 Hz to about 100,000 Hz.

In another aspect, the first polymer has storage shear modulus (G') of less than 100 MPa, less than 75 MPa, or less than 50 MPa. In one or more embodiments, the first polymer has such shear modulus (G') values at a single temperature or all temperatures within a temperature range from about −20° C. to about 40° C. In one or more embodiments, the first polymer has such shear modulus (G') values at a single frequency or all frequencies within a frequency range from about 1 Hz to about 20,000 Hz (or from about 1,000 Hz to about 10,000 Hz). In one aspect, the first polymer has storage shear modulus (G') of less than 100 MPa, less than 75 MPa, or less than 50 MPa at both a temperature within a temperature range from about −20° C. to about 40° C. and a frequency within a frequency range from about 1,000 Hz to about 20,000 Hz (or from about 1,000 Hz to about 10,000 Hz). In one aspect, the first polymer has storage shear modulus (G') of less than 100 MPa, less than 75 MPa, or less than 50 MPa at all temperatures along a temperature range from about −20° C. to about 40° C. and all frequencies within a frequency range from about 1,000 Hz to about 20,000 Hz (or from about 1,000 Hz to about 10,000 Hz).

In another aspect, the first polymer has a tan δ value greater than 1.0, greater than 1.25, greater than 1.5 or greater than 2, at a single temperature or all temperatures along a temperature range from about −20° C. to about 40° C., when measured at a mechanical frequency of 1 Hz and a heating rate of 2° C./min. In one aspect, the first polymer has a tan δ value greater than 1.0 at a temperature of 20° C. within a frequency range of 1 Hz to 20,000 Hz.

In another aspect, wherein the first polymer has a tan δ value greater than the core layer of acoustic PVB within a frequency or all frequencies along the range from about 1 Hz to about 20,000 Hz when compared at the same temperature. For example, the first polymer has a tan δ value that is 1.2, 1.5, 2.0, 2.5, 3.0, 3.5, or 4 times greater than the core layer of acoustic PVB within a frequency or all frequencies along the range from about 1 Hz to about 20,000 Hz, where any value can form a lower and upper endpoint of the frequency range.

In another aspect, the first polymer has a tan δ value from 2.0 to 4.0 at a single temperature or all temperatures along the temperature range from about −20° C. to about 40° C. when measured at a mechanical frequency of 1 Hz and a heating rate of 2° C./min. In a further aspect, the first polymer has a tan δ value from about 2.0 to about 4.0 at single temperature or all temperatures along the a temperature range from about −20° C. to about 40° C. at a single frequency or all frequencies along a frequency range from about 1,000 Hz to about 10,000 Hz. In another aspect, the first polymer has a tan δ value greater than 2.0 at a temperature of 20° C. at a single frequency or all frequencies along a frequency range from about 1,000 Hz to about 10,000 Hz.

By increasing the tan δ value of the first polymer, the damping properties of a laminate including the first polymer increase as well. For example, the laminates described herein have a greater sound transmission loss than a laminate composed of an interlayer of APVB, at the same thickness and temperature. In one aspect, the laminates described have a sound transmission loss that is 1.2, 1.5, 2.0, 2.5, 3.0, 3.5, or 4 times greater than a laminate having an APVB interlayer at the same thickness, where any value can form a lower and upper endpoint of the frequency range.

In one or more embodiments, the first polymer has a glass transition temperature in a range from about −10° C. to about 10° C., when measured at mechanical frequency of 1 Hz and a heating rate of 2° C./minute. In one or more specific embodiments, the first polymer has a glass transition temperature, when measured at mechanical frequency of 1 Hz and a heating rate of 2° C./minute, from about −10° C. to about 9° C., from about −10° C. to about 8° C., from about −10° C. to about 7° C., from about −10° C. to about 6° C., from about −10° C. to about 5° C., from about −10° C. to about 4° C., from about −10° C. to about 3° C., from about −10° C. to about 2° C., from about −10° C. to about 9° C., from about −10° C. to about 0° C., from about −9° C. to about 10° C., from about −8° C. to about 10° C., from about −8° C. to about 10° C., from about −7° C. to about 10° C., from about −6° C. to about 10° C., from about −5° C. to about 10° C., from about −4° C. to about 10° C., from about −3° C. to about 10° C., from about −2° C. to about 10° C., from about −1° C. to about 10° C., or from about 0° C. to about 10° C., and all ranges and sub-ranges therebetween.

In one or more embodiments, the first polymer is produced by the polymerization of one or more ethylenically unsaturated compounds. The phrase "ethylenically unsaturated compound" is defined herein as a compound that possesses at least one carbon-carbon double bond. Examples of ethylenically unsaturated compounds include, but are not limited to, an allyl compound, a vinyl compound, an acrylate, a methacrylate, an acrylamide, or a methacrylamide. Depending upon the application, the first polymer can be a homopolymer or a copolymer.

In one or more embodiments, the ethylenically unsaturated compound includes acrylic acid, lauryl acrylate (e.g., SR335 available from Sartomer Company, Inc., Ageflex FA12 available from CPS Chemical Co. (Old Bridge, N.J.), and Photomer 4812 available from Cognis f.k.a, Henkel (Ambler, Pa.)), laurylethoxylated(4) acrylate (e.g., CD9075 manufactured by Sartomer), 2-propylheptyl acrylate manufactured by BASF, ethoxylatednonylphenol acrylate (e.g., SR504 available from Sartomer Company Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., Photomer 4035 available from Cognis, and M140 manufactured by Miwon), phenoxyethoxyethyl acrylate (e.g., M142 manufactured by Miwon), phenoxyethoxethoxyethoxyethyl acrylate (e.g., M144 manufactured by Miwon), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate CN131 available from Sartomer Company, Inc.), lauryloxyglycidyl acrylate (e.g., CN130 available from Sartomer Company, Inc.), isobornyl acrylate (e.g., SR506 available from Sartomer Company, Inc., Ageflex IBOA available from CPS Chemical Co., and M1140 manufactured by Miwon), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), trimethylcyclohexylacrylate (e.g., M1130 manufactured by Miwon), adamatylmethacrylate, N-vinylcaprolactam, cyclic trimethylolpropane formal acrylate (e.g., M1110 manufactured by Miwon), tetrahydrofurfuryl acrylate (e.g., M150 manufactured by Miwon) and any combination thereof.

In some embodiments, the first polymer can be crosslinked. In one aspect, a crosslinking agent composed of two or more olefinic groups can be mixed with one or more monomers to produce a crosslinked first polymer. In one aspect, the crosslinking agent is a polyalkylene oxide diacrylate compound or a polyalkylene oxide dimethacrylate compound. For example, the polyalkylene can be a polymer of ethylene glycol, propylene glycol, or block co-polymers thereof. In one aspect, the crosslinking agent is a polypropylene glycol diacrylate having a molecular weight of about 400 (e.g., M2040 manufactured by Miwon Specialty Chemical Co.) or a tripropylene glycol diacrylate. In one or more embodiments, the crosslinking agent is 0.05%, 0.1%, 0.5%, 1.0%, 1.5%, 2.0, 3%, 5%, or 10% by weight of the first polymer, where any value can form a lower and upper endpoint of a range.

In one or more embodiments, the first polymer can include a number of processing and stabilizing molecules such as anti-oxidants (primary and secondary), photo-stabilizers, lubricants, or plasticizers.

In one or more embodiments, the first polymer is produced by the polymerization of one or more monomers having the formula I:

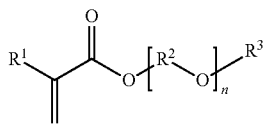

I wherein $R^1$ is hydrogen or an alkyl group;
$R^2$ is an alkylene group;
$R^3$ is an alkyl group, a cycloalkyl group, or an aryl group; and
n is from 1 to 20.

In one embodiment, $R^1$ is hydrogen and $R^2$ is ethylene. In one or more specific embodiments, $R^1$ is hydrogen, $R^2$ is ethylene, and $R^3$ is an aryl group. In yet other specific embodiments, $R^1$ is hydrogen, $R^2$ is ethylene, $R^3$ is a substituted or unsubstituted phenyl group, and n is from 1 to 10.

In one or more embodiments, the first polymer is the polymerization product of two monomers having formula I. In one or more specific embodiments, the first polymer is the polymerization product of a first constituent and a second constituent. In one or more embodiments, the first polymer is a polymerization of a first constituent, a second constituent and a third constituent. In one or more embodiments, the first constituent, second constituent and/or the third constituent is selected from the group consisting of ethoxylated nonylphenolacrylate, phenoxyethoxyethylacrylate, phenoxyethylacrylate, Trimethylcyclohexylacrylate, isobornyl acrylate, phenoxyethoxyethoxyethoxyethylacrylate, ethoxyethoxyethylacrylate, isooctyl acrylate, laurylethoxylated(4) acrylate, isodecyl acrylate, ethoxyethoxyethylacrylate, N-Vinylcaprolactam, 2-propylheptyl acrylate, heptadecyl acrylate, acrylic acid, isobornyl acrylate, and adamatylmethacrylate. In one or more embodiments, the first polymer is a polymerization product of phenoxyethylacrylate (e.g., M140 in an amount in a range from about 40 wt % to about 60 wt %) and phenoxyethoxyethylacrylate (e.g., M142 in an amount in a range from about 40 wt % to about 60 wt %). In one or more embodiments, the first polymer is a polymerization product of isobornyl acrylate (e.g., M1140 in an amount in a range from about 25 to about 45 wt %) and phenoxyethoxyethoxyethoxyethylacrylate (e.g., M144 in an amount in a range from about 50 wt % to about 75 wt %). In one or more embodiments, the first polymer is a polymerization product of phenoxyethylacrylate (e.g., M140 in an amount in a range from about 40 wt % to about 60 wt %) and phenoxyethoxyethoxyethoxyethylacrylate (e.g., M144 in an amount in a range from about 40 wt % to about 60 wt %). In one or more embodiments, the first polymer is a polymerization product of phenoxyethylacrylate (e.g., M140 in an amount in a range from about 10 wt % to about 25 wt %) and phenoxyethoxyethylacrylate (e.g., M142 in an amount in a range from about 75 wt % to about 90 wt %). In one or more embodiments, the first polymer is a polymerization product of isobornyl acrylate (e.g., M1140 in an amount in a range from about 35 wt % to about 55 wt %) and ethoxyethoxyethylacrylate (e.g., SR256 in an amount in a range from about 45 wt % to about 65 wt %). In one or more embodiments, the first polymer is a polymerization product of isobornyl acrylate (e.g., M1140 in an amount in a range from about 30 wt % to about 50 wt %) and phenoxyethoxyethoxyethylacrylate (e.g., M144 in an amount in a range from about 40 wt % to about 70 wt %). In one or more embodiments, the first polymer is a polymerization product of isobornyl acrylate (e.g., M1140 in an amount in a range from about 35 wt % to about 55 wt %) and laurylethoxylated (4)acrylate (e.g., CD9075 in an amount in a range from about 45 wt % to about 65 wt %). In one or more embodiments, the first polymer is a polymerization product of isobornyl acrylate (e.g., M1140 in an amount in a range from about 40 wt % to about 60 wt %) and isodecyl acrylate (e.g., SR395 in an amount in a range from about 40 wt % to about 60 wt %). In one or more embodiments, the first polymer is a polymerization product of isobornyl acrylate (e.g., M1140 in an amount in a range from about 20 wt % to about 40 wt %), henoxyethylacrylate (e.g., M140 in an amount in a range from about 20 wt % to about 40 wt %) and ethoxyethoxyethylacrylate (e.g., SR256 in an amount in a range from about 30 wt % to about 50 wt %). In one or more embodiments, the first polymer is a polymerization product of isobornyl acrylate (e.g., M1140 in an amount in a range from about 40 wt % to about 60 wt %) and laurylethoxylated(4) acrylate (e.g., CD9075 in an amount in a range from about 40 wt % to about 60 wt %). In one or more embodiments, the first polymer is a polymerization product of isobornyl acrylate (e.g., M1140 in an amount in a range from about 20 wt % to about 40 wt %) and isodecyl acrylate (e.g., SR395 in an amount in a range from about 60 wt % to about 80 wt %). In one or more embodiments, the first polymer is a polymerization product of phenoxyethylacrylate (e.g., M140 in an amount in a range from about 20 wt % to about 40 wt %) and phenoxyethoxyethylacrylate (e.g., M142 in an amount in a range from about 60 wt % to about 80 wt %). In one or more embodiments, the first polymer is a polymerization product of trimethylcyclohexylacrylate (e.g., M1130 in an amount in a range from about 5 wt % to about 25 wt %) and phenoxyethoxyethylacrylate (e.g., M142 in an amount in a range from about 75 wt % to about 95 wt %). In one or more embodiments, the first polymer is a polymerization product of isobornyl acrylate (e.g., M1140 in an amount in a range from about 5 wt % to about 25 wt %) and phenoxyethoxyethylacrylate (e.g., M142 in an amount in a range from about 75 wt % to about 95 wt %). In one or more embodiments, the first polymer is a polymerization product of N-Vinylcaprolactam (e.g., NVC in an amount in a range from about 1 wt % to about 20 wt %) and phenoxyethoxyethylacrylate (e.g., M142 in an amount in a range from about 80 wt % to about 99 wt %). In one or more embodiments, the first polymer is a polymerization product of 2-propylheptyl acrylate (e.g., 2-PHA in an amount in a range from about 50 wt % to about 80 wt %) and isobornyl acrylate (e.g., IBOA in an amount in a range from about 20 wt % to about 50 wt %). In one or more embodiments, the first polymer is a polymerization product of heptadecyl acrylate (e.g., C17A in an amount in a range from about 50 wt % to about 80 wt %) and isobornyl acrylate (e.g., IBOA in an amount in a range from about 20 wt % to about 50 wt %). In one or more embodiments, the first polymer is a polymerization product of acrylic acid (e.g., AA in an amount in a range from about 1 wt % to about 20 wt %) and laurylethoxylated(4)acrylate (e.g., CD9075 in an amount in a range from about 80 wt % to about 99 wt %). In one or more embodiments, the first polymer is a polymerization product of acrylic acid (e.g., AA in an amount in a range from about 5 wt % to about 25 wt %) and isodecyl acrylate (e.g., SR395 in an amount in a range from about 75 wt % to about 95 wt %). In one or more embodiments, the first polymer is a polymerization product of acrylic acid (e.g., AA in an amount in a range from about 5 wt % to about 25 wt %) and isooctyl acrylate (e.g., SR440 in an amount in a range from about 75 wt % to about 95 wt %). In one or more embodiments, the first polymer is a polymerization product of isobornyl acrylate (e.g., IBOA in an amount in a range from about 5 wt % to about 25 wt %) and isooctyl acrylate (e.g., SR440 in an amount in a range from about 75 wt % to about 95 wt %). In one or more embodiments, the first polymer is a polymerization product of isobornyl acrylate (e g., IBOA in an amount in a range from about 5 wt % to about 25 wt %), isooctyl acrylate (e.g., SR440 in an amount in a range from about 75 wt % to about 90 wt %) and acrylic acid (e.g., AA in an amount in a range from about 1 wt % to about 15 wt %). In one or more embodiments, the first polymer is a polymerization product of ethoxylated nonylphenolacrylate (e.g., M111 in an amount in a range from about 15 wt % to about 35 wt %) and adamatylmethacrylate (e.g., ADMA in an amount in a range from about 25 wt % to about 45 wt %). In one or more embodiments, the first polymer is a polymerization product of ethoxylated nonylphenolacrylate (e.g., M111 in an amount in a range from about 15 wt % to about 35 wt %) and isobornyl acrylate (e.g., IBOA in an amount in a range from about 25 wt % to about 45 wt %).

In one or more embodiments, the first polymer is a polymerization product of phenoxyethylacrylate (e.g., M140 manufactured by Miwon Specialty Chemical Co.) and ethoxylated(8)nonylphenol acrylate (e.g., M166 manufactured by Miwon Specialty Chemical Co.). In one or more embodiments, the phenoxyethylacrylate is 70%, 75%, 80%, 85%, 90%, or 95% by weight of the first polymer, where any value can form a lower and upper endpoint of a range, and ethoxylated(8)nonylphenol acrylate is 5%, 10%, 15%, 20%, 25%, or 30% by weight of the first polymer, where any value can form a lower and upper endpoint of a range. In one or more embodiments, the first polymer is further crosslinked with 0.5% to 2% polypropylene glycol diacrylate having a molecular weight of about 400 (e.g., M2040 manufactured by Miwon Specialty Chemical Co.).

In one or more embodiments, the first polymer is the polymerization product of phenoxyethoxyethylacrylate ($R^1$ is H, $R^2$ is $CH_2CH_2$, and $R^3$ is unsubstituted phenyl in formula I) (e.g., M142 manufactured by Miwon Specialty Chemical Co.) and one or more ethylenically unsaturated compounds. In one or more embodiments, the phenoxyethoxyethylacrylate is 50%, 55%, 60%, 65%, 70%, 75%, 80%, 85%, 90%, or 95% by weight of the first polymer, where any value can form a lower and upper endpoint of a range, and the ethylenically unsaturated compound is 5%, 10%, 15%, 20%, 25%, 30%, 35%, 40%, 45%, or 50% by weight of the first polymer, where any value can form a lower and upper endpoint of a range.

In one or more embodiments, the first polymer is the polymerization product between 95% to 99% phenoxyethoxyethylacrylate (e.g., M142 manufactured by Miwon Specialty Chemical Co.) and 0.5% to 2% polypropylene glycol diacrylate having a molecular weight of about 400 (e.g., M2040 manufactured by Miwon Specialty Chemical Co.) In one or more specific embodiments, the first polymer is the polymerization product between 40% to 70% phenoxyethoxyethylacrylate (e.g., M142 manufactured by Miwon Specialty Chemical Co.), 30% to 60% phenoxyethoxyethylacrylate (e.g., M140 manufactured by Miwon Specialty Chemical Co.) and 0.5% to 2% polypropylene glycol diacrylate having a molecular weight of about 400 (e.g., M2040 manufactured by Miwon Specialty Chemical Co.). In a further aspect, the first polymer is the polymerization product between 50% to 80% phenoxyethoxyethoxyethylacrylate (e.g., M144 manufactured by Miwon Specialty Chemical Co.), 20% to 80% isobornyl acrylate (e.g., M1140 manufactured by Miwon Specialty Chemical Co.) and 0.5% to 2% polypropylene glycol diacrylate having a molecular weight of about 400 (e.g., M2040 manufactured by Miwon Specialty Chemical Co.).

In one or more embodiments, the first polymer is the polymerization product between 5% to 70% isobornyl acrylate (e.g., M1140 manufactured by Miwon Specialty Chemical Co.), 0.5% to 2% polypropylene glycol diacrylate having a molecular weight of about 400 (e.g., M2040 manufactured by Miwon Specialty Chemical Co.) and one of the following monomers: ethoxyethoxyethylacrylate (40% to 70%); phenoxyethoxyethoxyethylacrylate (40% to 70%); laurylethoxylated(4) acrylate (40% to 80%); isodecyl acrylate (30% to 80%); phenoxyethylacrylate (10% to 50%); and phenoxyethoxyethylacrylate.

In one or more embodiments, the first polymer is the polymerization product between phenoxyethoxyethylacrylate (60% to 95%), 0.5% to 2% polypropylene glycol diacrylate having a molecular weight of about 400, and one of the following monomers: phenoxyethylacrylate (5% to 50%); trimethylcyclohexylacrylate (5% to 30%): and N-vinylcaprolactam (1% to 20%), in one or more specific embodiments, the first polymer is the polymerization product between phenoxyethoxyethoxyethoxyethylacrylate (30% to 70%), 0.5% to 2% polypropylene glycol diacrylate having a molecular weight of about 400, and phenoxyethylacrylate (30% to 70%).

In one or more embodiments, the first polymer is the polymerization product between 40% to 80% 2-propylheptyl acrylate, 20% to 60% isobornyl acrylate, and 0.01% to 1% tripropylene glycol diacrylate. In one or more specific embodiments, the first polymer is the polymerization product between 40% to 80% heptadecyl acrylate, 20% to 60% isobornyl acrylate, and 0.01% to 1% tripropylene glycol diacrylate. In yet even more specific embodiments, the first polymer is the polymerization product between 1% to 20% acrylic acid, 0.01% to 1% tripropylene glycol diacrylate, and one of the following monomers: laurylethoxylated(4) acrylate (80% to 99%) or isodecyl acrylate (80% to 99%).

In one or more embodiments, the first polymer is the polymerization product between 1% to 20% acrylic acid, 80% to 99% isooctyl acrylate, and one of the following crosslinkers: 0.5% to 2% polypropylene glycol diacrylate having a molecular weight of about 400 or 0.01% to 1% tripropylene glycol diacrylate. In one or more embodiments, the first polymer is the polymerization product between 1% to 20% isobornyl acrylate, 80% to 99% isooctyl acrylate, and one of the following crosslinkers: 0.5% to 2% polypropylene glycol diacrylate having a molecular weight of about 400 or 0.01% to 1% tripropylene glycol diacrylate. In one or more embodiments, the first polymer is the polymerization product between 1% to 20% isobornyl acrylate, 80% to 99% isooctyl acrylate, 1% to 10% acrylic acid, and one of the following crosslinkers: 0.5% to 2% polypropylene glycol diacrylate having a molecular weight of about 400 or 0.01% to 1% tripropylene glycol diacrylate.

In one or more embodiments, the first polymer is the polymerization product between phenoxyethoxyethylacrylate (75% to 90%), 0.5% to 1.5% polypropylene glycol diacrylate having a molecular weight of about 400, and 10% to 20% phenoxyethylacrylate.

In one or more embodiments, the first polymer is the polymerization product between phenoxyethoxyethylacrylate (65% to 80%), 0.5% to 1.5% polypropylene glycol diacrylate having a molecular weight of about 400, and 20% to 30% phenoxyethylacrylate.

In one or more embodiments, the first polymer is the polymerization product between phenoxyethoxyethylacrylate (80% to 95%), 0.5% to 1.5% polypropylene glycol diacrylate having a molecular weight of about 400, and 5% to 20% trimethylcyclohexyl acrylate.

In one or more embodiments, an ethylenically unsaturated oligomer can be polymerized with one or more unsaturated monomers to produce the polymers described herein. Suitable ethylenically unsaturated oligomers include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al.), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al, U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof. In one aspect, the oligomer is UC-102 manufactured by Kurray Co. (1,3-butadiene, 2-methyl-homopolymer, maleated, 2-[(2-methyl-1-oxo-2-propenyl)oxy] ethyl esters).

In one or more embodiments, the first polymer is the polymerization product between 10% to 30% ethoxylated nonylphenolacrylate, 20% to 50 of an oligomer (e.g., UC-102 manufactured by Kurray Co.) and one of the following monomers: isobornyl acrylate (20% to 50%) or adamatylmethacrylate (20% to 50%).

The first polymer can be produced using techniques known in the art. In one aspect, the monomer(s) used to produce the first polymer can include an initiator. Initiators useful herein include a thermal initiator, a chemical initiator, or a photoinitiator to promote polymerization of the monomer(s). In other aspects, chain transfer agents (e.g., isooctyl 3-mercaptopropionate) can be used to facilitate the production of the polymers.

In one or more embodiments, photoinitiators such as ketonic photoinitiating and/or phosphine oxide additives can be used herein. When used to produce the polymers described herein, the photoinitiator is present in an amount sufficient to provide rapid ultraviolet curing. Generally, this includes between about 0.1 to about 10.0 percent by weight. Examples of photoinitiators useful herein include, but not limited to, 1-hydroxycyclohexylphenyl ketone (e.g., IRGACURE 184 available from Ciba Specialty Chemical (Hawthorne, N.Y.); bis(2,6-dimethoxybenzoyl)-2,4,4-trimethylpentylphosphine oxide (e.g., commercial blends IRGACURE 1800, 1850, and 1700 available from Ciba Specialty Chemical); 2,2-dimethoxy-2-phenylacetophenone (e.g., IRGACURE 651, available from Ciba Specialty Chemical); bis(2,4,6-trimethylbenzoyl)phenylphosphine oxide (IRGACURE 819); (2,4,6-trimethylbenzoyl)diphenyl phosphine oxide (LUCIRIN TPO, available from BASF (Munich, Germany)); ethoxy(2,4,6-trimethylbenzoyl)phenylphosphine oxide (LUCIRIN TPO-L from BASF); and combinations thereof.

In one or more embodiments, the first polymer is produced prior to laminate production. Here, the first polymer can be manufactured to have specific dimensions prior to being disposed between the first and second substrate. In one or more embodiments, a mixture composed of one or more monomers, photoinitiator, and optional crosslinking agent described herein can be applied to a surface of the first and/or second substrate followed by bringing the first and second substrate together so that a thin film of the monomer is disposed between the first and second substrate. The laminate is subsequently exposed to UV light in order to cure the monomer(s) and produce the first polymer in situ.

In one or more embodiments, two or more polymers can be admixed together to produce a final polymeric composition with the properties described herein (e.g., tan δ value greater than 1.0). Thus, the combination of two or more polymers can be used to modify the mechanical properties of the polymer composition in order to optimize the damping properties of the resulting laminate.

The thickness of the first polymer can vary depending upon the application of the laminate. In one or more embodiments, the thickness of the first polymer can be in the range from about 0.01 mm to about 2 mm. In another aspect, the thickness of the first polymer is in the range from about 0.01 mm to about 1.8 mm, in the range from about 0.01 mm to about 1.6 mm, in the range from about 0.01 mm to about 1.5 mm, in the range from about 0.01 mm to about 1.4 mm, in the range from about 0.01 mm to about 1.2 mm, in the range from about 0.01 mm to about 1 mm, in the range from about 0.01 mm to about 0.8 mm, in the range from about 0.01 mm to about 0.6 mm, in the range from about 0.01 mm to about 0.5 mm, in the range from about 0.01 mm to about 0.4 mm, in the range from about 0.01 mm to about 0.2 mm, in the range from about 0.05 mm to about 2 mm, in the range from about 0.1 mm to about 2 mm, in the range from about 0.2 mm to about 2 mm, in the range from about 0.3 mm to about 2 mm, in the range from about 0.4 mm to about 2 mm, in the range from about 0.5 mm to about 2 mm, in the range from about 0.6 mm to about 2 mm, in the range from about 0.7 mm to about 2 mm, in the range from about 0.8 mm to about 2 mm, in the range from about 0.9 mm to about 2 mm, or in the range from about 1 mm to about 2 mm, and all ranges and sub-ranges therebetween. The interlayer structure may have a thickness in the range from about 0.5 mm to about 2.5 mm, from about 0.5 mm to about 2.4 mm, from about 0.5 mm to about 2.2 mm, from about 0.5 mm to about 2 mm, from about 0.5 mm to about 1.8 mm, from about 0.5 mm to about 1.6 mm, from about 0.5 mm to about 1.5 mm, from about 0.5 mm to about 1.4 mm, from about 0.5 mm to about 1.2 mm, from about 0.5 mm to about 1 mm, from about 0.6 mm to about 2.5 mm, from about 0.7 mm to about 2.5 mm, from about 0.8 mm to about 2.5 mm, from about 0.9 mm to about 2.5 mm, from about 1 mm to about 2.5 mm, from about 1.1 mm to about 2.5 mm, from about 1.2 mm to about 2.5 mm, from about 1.3 mm to about 2.5 mm, from about 1.4 mm to about 2.5 mm, from about 1.5 mm to about 2.5 mm, from about 1 mm to about 2 mm, from about 1.1 mm to about 2 mm, from about 1.2 mm to about 2 mm, from about 1.3 mm to about 2 mm, from about 1.4 mm to about 2 mm, from about 1 mm to about 1.9 mm, from about 1 mm to about 1.8 mm, or from about 1 mm to about 1.7 mm, and all ranges and sub-ranges therebetween.

First and Second Substrate

The first and second substrates 110 and 130 may have the same thickness or differing thicknesses. In some embodiments, the thickness of the first substrate 110 may be in the range from about 0.3 mm to about 4 mm (e.g., from about 0.4 mm to about 4 mm, from about 0.5 mm to about 4 mm, from about 0.55 mm to about 4 mm, from about 0.6 mm to about 4 mm, from about 0.7 mm to about 4 mm, from about 0.8 mm to about 1 mm, from about 0.9 mm to about 4 mm, from about 1 mm to about 4 mm, from about 1.2 mm to about 4 mm, from about 1.5 mm to about 4 mm, from about 1.8 mm to about 4 mm, from about 2 mm to about 4 mm, from about 2.1 mm to about 4 mm, from about 2.5 mm to about 4 mm, from about from about 1 mm to about 4 mm, from about 0.3 mm to about 3 mm, from about 0.3 mm to about 2.1 mm, from about 0.3 mm to about 2 mm, from about 0.3 mm to about 1.8 mm, from about 0.3 mm to about 1.5 mm, from about 0.3 mm to about 1 mm, from about 0.3 mm to about 0.7 mm, or from about 1.2 mm to about 1.8 mm, and all ranges and sub-ranges therebetween.

In one or more embodiments, the thickness of the second substrate 130 may be less than the thickness of the first substrate 110. In some embodiments, the second substrate 230 is about 1.6 mm or less, less than 1.6 mm, 1.5 mm or less, 1.4 mm or less, 1.3 mm or less, 1.2 mm or less, 1.1 mm or less, 1 mm or less, 0.7 mm or less, 0.5 mm or less or about 0.4 mm or less. In some embodiments, the thickness of the second substrate 230 may be in the range from about 0.3 mm to about 4 mm (e.g., from about 0.4 mm to about 4 mm, from about 0.5 mm to about 4 mm, from about 0.55 mm to about 4 mm, from about 0.6 mm to about 4 mm, from about 0.7 mm to about 4 mm, from about 0.8 mm to about 1 mm, from about 0.9 mm to about 4 mm, from about 1 mm to about 4 mm, from about 1.2 mm to about 4 mm, from about 1.5 mm to about 4 mm, from about 1.8 mm to about 4 mm, from about 2 mm to about 4 mm, from about 2.1 mm to about 4 mm, from about 2.5 mm to about 4 mm, from about 1 mm to about 4 mm, from about 0.3 mm to about 3 mm, from about 0.3 mm to about 2.1 mm, from about 0.3 mm to about 2 mm, from about 0.3 mm to about 1.8 mm, from about 0.3 mm to about 1.5 mm, from about 0.3 mm to about 1 mm, from about 0.3 mm to about 0.7 mm, and all ranges and sub-ranges therebetween.

In embodiments in which the first substrate 110 has a thickness greater than the second substrate, the second substrate may have a thickness of about 1.5 mm or less, about 1 mm or less or about 0.7 mm or less. The difference in thickness between the first substrate 110 and the second substrate 130 may be about 0.5 mm or greater, 0.7 mm or greater, 0.8 mm or greater, 1 mm or greater or about 1.4 mm or greater. Some exemplary thickness combinations for the first substrate 110 and the second substrate 130 may be (written in the form of first substrate thickness in millimeters/second substrate thickness in millimeters) 2.1/1.8, 2.1/1.5, 2.1/1, 2.1/0.7, 2.1/0.55, 2.1/0.4, 1.8/1.8, 1.8/1.5, 1.8/1, 1.8/0.7, 1.8/0.55, 1.8/0.4, 1.5/1.5, 1.5/1, 1.5/0.7, 1.5/0.55, 1.5/0.4, 1/1, 1/0.7, 1/0.55, 1/0.4, 0.7/0.7, 0.7/0.55, 0.55/0.55, 0.55/0.5, 0.55/0.4, 0.5/0.5, 0.5/0.4, and 0.4/0.4.

The thickness of the first substrate 110 and the second substrate 130 may be described by a ratio. In some embodiments, the ratio of the thickness of the second substrate to the thickness of the first substrate is greater than about 0.33. In some cases the ratio may be about 0.35 or greater, 0.37 or greater, 0.39 or greater, 0.4 or greater, 0.42 or greater, 0.44 or greater, 0.46 or greater, 0.48 or greater, about 0.5 or greater, or about 0.55 or greater. The upper limit of the ratio of the thickness of the second substrate to the thickness of the first substrate may be about 1. In some embodiments, the first and second substrates 110, 130 may each have a thickness of about 1.5 mm or less, 1 mm or less, or even 0.7 mm or less, and still exhibit a ratio that is greater than 0.33. In one or more embodiments, such thin laminates may still exhibit the transmission loss performance described herein at frequencies of about 2500 Hz or greater.

In one or more embodiments, either one or both of the first and second substrates 110, 130 exhibits a refractive index in the range from about 1.45 to about 1.55. In specific embodiments, either one or both of the first and second substrates 110, 130 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, either one or both of the first and second substrates 110, 130 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Either one or both of the first and second substrates 110, 130 may exhibit an elastic modulus (or shear modulus) in the range from about 30 GPa to about 120 GPa. In some instances, the elastic modulus of either one or both of the first and second substrates 210, 230 may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

The materials used in the laminate may vary according to application or use. In one or more embodiments, the first substrate 110 and second layer 130 may be characterized as having a greater modulus than the interlayer structure 120. In some embodiments, the first and second substrates 110 and 130 may be described as inorganic and may include an amorphous substrate, a crystalline substrate or a combination thereof. Either one or both the first and second substrates 110 and 130 may be formed from man-made materials and/or naturally occurring materials. In some specific embodiments, the substrate 110 may specifically exclude plastic and/or metal substrates.

In some embodiments, either one or both of the first and second substrates 110 and 130 may be organic and specifically polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclopolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In one or more embodiments, either one or both of the first and second substrates 110, 130 may be amorphous and may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, either one or both of the first and second substrates 110, 130 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

Either one or both of the first and second substrates 110, 130 may be substantially planar or sheet-like, although other embodiments may utilize a curved or otherwise shaped or sculpted substrate. Either one or both of the first and second substrates 110, 130 may be substantially optically clear, transparent and free from light scattering.

Additionally or alternatively, the physical thickness of either one or both of the first and second substrates 110, 130 may vary along one or more of its dimensions for aesthetic and/or functional reasons. For example, the edges of a substrate may be thicker as compared to more central regions. The length, width and physical thickness dimensions of either one or both of the first and second substrates 110, 130 may also vary according to the application or use.

The first and second substrate 110, 130 may be provided using a variety of different processes. For instance, where the substrate includes an amorphous substrate such as glass, various forming methods can include float glass processes and down-draw processes such as fusion draw and slot draw.

Once formed, either one or both of the first and second substrates 110, 130 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), and depth of compressive stress layer (DOC) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

The degree of strengthening exhibited by either one or both the first and second substrates may be quantified by the parameters of central tension (CT), surface compressive stress (CS), and depth of compression (DOC). CT and CS are provided in units of MPa and DOC is typically provided in units of micrometers or as a fraction of the total thickness of the substrate. As used herein, the terms "depth of compression" and "DOC" refer to the depth at which the stress within the substrate changes from compressive to tensile stress. At the DOC, the stress crosses from a positive (compressive) stress to a negative (tensile) stress and thus exhibits a stress value of zero.

Where strengthened glass is used for the substrate, surface CS may be measured near the surface or within the strengthened glass substrate at various depths. A maximum CS value may include the measured CS at the surface ($CS_s$) of the strengthened substrate. CS and DOC are measured using those means known in the art. Such means include, but are not limited to, measurement of surface stress using a surface stress meter, such as the commercially available instrument the FSM-6000, manufactured by Luceo Co., Ltd. (Tokyo, Japan). Surface stress measurements rely upon the accurate measurement of the stress optical coefficient (SOC), which is related to the birefringence of the glass substrate. SOC in turn is measured according to a modified version of Procedure C described in ASTM standard C770-98 (2013), entitled "Standard Test Method for Measurement of Glass Stress-Optical Coefficient," the contents of which are incorporated herein by reference in their entirety. The modification includes using a glass disc as the specimen with a thickness of 5 to 10 mm and a diameter of 12.7 mm, wherein the disc is isotropic and homogeneous and core drilled with both faces polished and parallel. The modification also includes calculating the maximum force, Fmax to be applied. The force should be sufficient to produce at least 20 MPa compression stress. Fmax is calculated as follows:

$$Fmax = 7.854 * D * h$$

Where:
Fmax=Force in Newtons
D=the diameter of the disc
h=the thickness of the light path
For each force applied, the stress is computed as follows:

$$\sigma_{MPa} = 8F/(\pi * D * h)$$

Where:
F=Force in Newtons
D=the diameter of the disc
h=the thickness of the light path In some embodiments, the CT, which is computed for the inner region adjacent the compressive stress layer within a glass substrate, can be calculated from the CS, the physical thickness t, and the DOC. The relationship between CS and CT is given by the expression (1):

$$CT = (CS \cdot DOC)/(t - 2DOC) \qquad (1),$$

wherein t is the physical thickness (μm) of the glass article.

In one embodiment, a strengthened substrate can have a surface CS in the range from about 50 MPa to about 800 MPa (e.g., about 100 MPa or greater, about 150 MPa or greater, about 200 MPa or greater, of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, or 750 MPa or greater). The strengthened substrate may have a DOC in the range from about 35 μm to about 200 μm (e.g., 45 μm, 60 μm, 75 μm, 100 μm, 125 μm, 150 μm or greater). In one or more specific embodiments, the strengthened substrate has one or more of the following: a surface CS of about 50 MPa to about 200 MPa, and a DOC in the range from about 100 μm to about 200 μm; a surface CS of about 600 MPa to about 800 MPa and a DOC in the range from about 35 μm to about 70 μm.

The strengthened substrate may have a DOC in the range from about 35 μm to about 200 μm (e.g., 45 μm, 60 μm, 75 μm, 100 μm, 125 μm, 150 μm or greater). In one or more specific embodiments, the strengthened substrate has one or more of the following: a surface CS of about 50 MPa to about 200 MPa, and a DOC in the range from about 100 μm to about 200 μm; a surface CS of about 600 MPa to about 800 MPa and a DOC in the range from about 35 μm to about 70 μm.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio, $$\frac{Al_2O_3 + B_2O_3}{\sum \text{modifiers}} > 1$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where a substrate 110, 130 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110, 130 may include a glass ceramic substrate, which may be strengthened or non-strengthened. Examples of suitable glass ceramics may include $Li_2O$—$Al_2O_3$—$SiO_2$ system (i.e. LAS-System) glass ceramics, $MgO$—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

In one or more embodiments, the first substrate is unstrengthened, while the second substrate is strengthened. In some embodiments, the first substrate may include a soda lime glass. Optionally, the first substrate may include a soda lime glass that is strengthened. In another embodiment, the first substrate may include an alkali aluminosilicate glass that is strengthened.

The substrate composition may include a colorant to provide darkening for privacy glass, and/or reducing the transmission of infrared radiation for solar glass.

Applications of the Laminates

The laminates described herein can be used as windows and glazing in architectural and transportation applications. The laminates can also be used as panels in balustrades and stairs, and as decorative panels or covering for walls, columns, elevator cabs, kitchen appliances and other applications. The laminates may be transparent, semi-transparent, translucent or opaque and may comprise part of a window, panel, wall, enclosure, sign or other structure. Common types of such laminates may also be tinted or colored or include a component that is tinted or colored.

Figure 3:
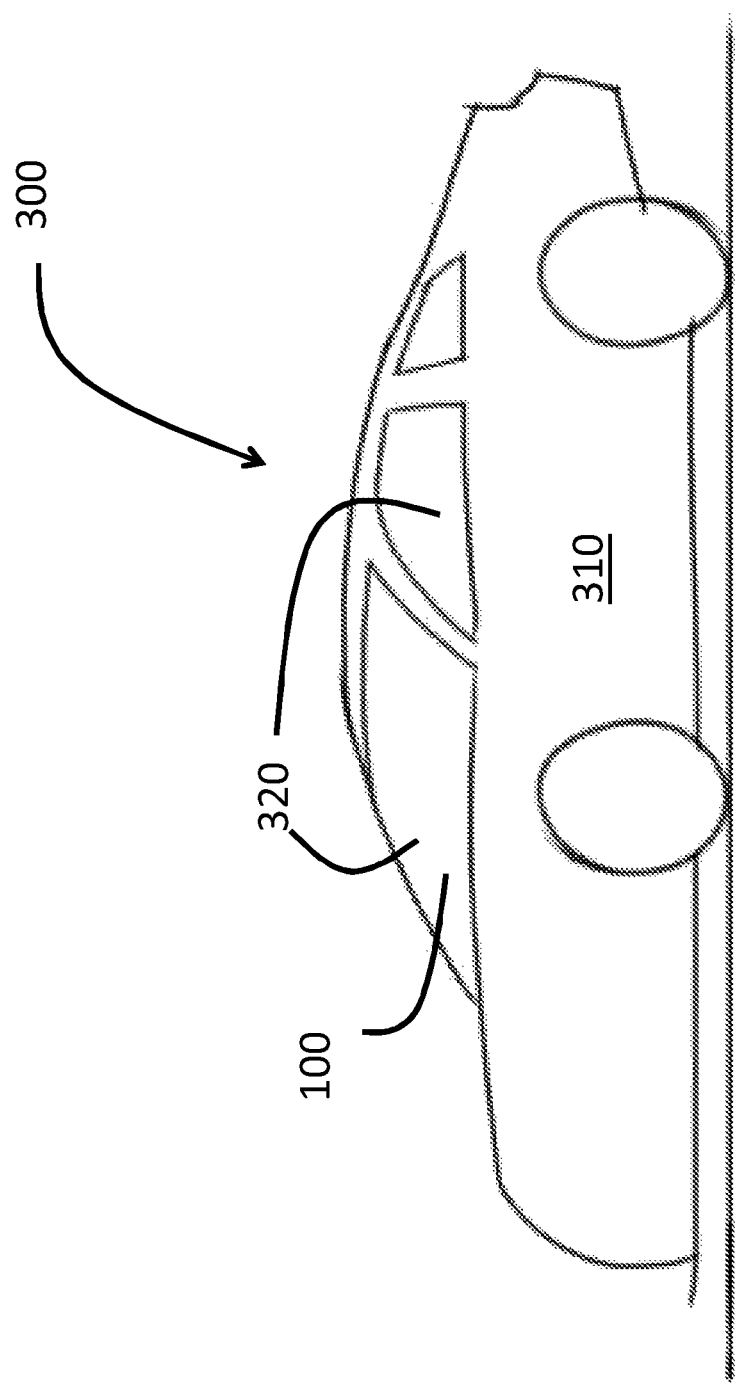
FIG. 3 is a perspective view of a vehicle where a laminate described herein can be incorporated.

An example of a vehicle that includes a laminate as described herein is shown in FIG. 3. The vehicle 300 includes a body 310 with at least one opening 320. The laminate 100 is disposed in the at least one opening 320. As used herein, the term "vehicle" may include automobiles (e.g., cars, vans, trucks, semi-trailer trucks, motorcycles, and buses), rolling stock, locomotives, train cars, aircraft (e.g., helicopters, planes, gliders, drones, etc.), and seacraft (ships, boats, etc.) and the like. The opening 320 is a window within which a laminate is disposed to provide a transparent covering.

The laminate may be disposed in an opening of a vehicle or within an architectural panel by adhesives and other means (e.g., clamps, fasteners, etc.) to secure the laminate thereto.

Depending upon the application of the laminate (e.g., windows in an automobile), it is desirable that the laminate be transparent. The selection of the first material and the first polymer can affect the transparency of the laminate. In one aspect, the first polymer has an average transmittance of greater than 80%, over a wavelength range from about 400 nm to about 700 nm, at a first polymer thickness of 1 mm. In another aspect, the laminates described herein exhibit an average transmittance of greater than 80%, over a wavelength range from about 400 nm to about 700 nm. The laminate may exhibit such average transmittance values over any one or more of the thicknesses disclosed herein. The transmittance values provided herein may be measured using a CIE illuminant such as D65 or F02 and may be measured at normal incidence.

In one or more embodiments, the laminate may have a thickness in a range from about 1 mm to about 10 mm. For example, the laminate may have a thickness in a range from about 1.2 mm to about 10 mm, from about 1.4 mm to about 10 mm, from about 1.5 mm to about 10 mm, from about 1.6 mm to about 10 mm, from about 1.8 mm to about 10 mm, from about 2 mm to about 10 mm, from about 2.2 mm to about 10 mm, from about 2.4 mm to about 10 mm, from about 2.5 mm to about 10 mm, from about 2.6 mm to about 10 mm, from about 2.8 mm to about 10 mm, from about 3 mm to about 10 mm, from about 3.2 mm to about 10 mm, from about 3.4 mm to about 10 mm, from about 3.5 mm to about 10 mm, from about 3.6 mm to about 10 mm, from about 3.8 mm to about 10 mm, from about 4 mm to about 10 mm, from about 1 mm to about 9 mm, from about 1 mm to about 8 mm, from about 1 mm to about 7 mm, from about 1 mm to about 6 mm, from about 1 mm to about 5 mm, from about 1 mm to about 4 mm, from about 1 mm to about 3.8 mm, from about 1 mm to about 3.6 mm, from about 1 mm to about 3.5 mm, from about 1 mm to about 3.4 mm, from about 1 mm to about 3.2 mm, from about 1.6 mm to about 2.2 mm, from about 1.6 mm to about 2.4 mm, from about 1.6 mm to about 2.5 mm, from about 1.6 mm to about 2.6 mm, from about 1.6 mm to about 2.8 mm, from about 1.6 mm to about 3 mm, from about 1.6 mm to about 3.2 mm, from about 3.7 mm to about 5.7 mm, from about 3.5 mm to about 5.5 mm, and all ranges and sub-ranges therebetween.

In one or more embodiments, the laminates described herein exhibit a sound transmission loss of about 38 dB or greater, over a frequency range from about 2500 Hz to about 6000 Hz. For example, a laminate according to one or more embodiments described herein exhibits a sound transmission loss of about 38.2 dB or greater, about 38.4 dB or greater, about 38.5 dB or greater, about 38.6 dB or greater, about 38.8 dB or greater, about 39 dB or greater, about 39.2 dB or greater, about 39.4 dB or greater, about 39.5 dB or greater, about 39.6 dB or greater, about 39.8 dB or greater, about 40 dB or greater, about 40.2 dB or greater, about 40.4 dB or greater, about 40.5 dB or greater, about 40.6 dB or greater, about 40.8 dB or greater, or about 41 dB or greater, all over a frequency range from about 2500 Hz to about 6000 Hz. In some embodiments, the sound transmission loss values described herein may be exhibited over a frequency range from about 4000 Hz to about 6000 Hz, from about 4200 Hz to about 6000 Hz, from about 4500 Hz to about 6000 Hz, or from about 5000 Hz to about 6000 Hz.

In the case when the laminates described herein are used as windows in automobiles or other vehicles, the laminates will meet the FMVSS 205 standards under 49 CFR 571.205, which includes the standards approved by American National Standards Institute (e.g., ANSI/SAE Z26.1-1996) and Society of Automotive Engineers (e.g., SAE J673).

The laminates described herein may include one or more films, coatings or surface treatments to provide added functionality. Examples of such films and/or coatings include anti-reflective coatings, UV absorbing coatings, IR reflecting coatings, anti-glare surface treatments, and the like.

In other aspects, the laminates described herein can be photochromic. For example, the first substrate, the second substrate, the interlayer structure (e.g., the first polymer), or any combination thereof can be doped with one or more photochromic agents known in the art to photochromic laminates.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Measurement of Dynamic Mechanical Shear Properties of Polymer Samples

A film sample of polymer material having a thickness in the range from about 0.8 to about 1.7 mm is loaded between circular parallel plate fixtures (8 mm diameter) in a rheometer model DHR-3 (TA Instruments). Multiple layers of material were used to achieve the desired specimen thickness between the plates. The instrument was run with the following primary mechanical and environmental settings for a temperature ramp test and a temperature sweep test on the instrument. Some of the settings were adjusted depending on individual material to get the optimum readings from the instrument.

For the temperature ramp test, the axial force adjust mode was set to active compression using a load in the range from 1N to 5N. The initial temperature was set in the range from −50° C. to 0° C. depending on the glass transition temperature of the sample and allowed to soak for up to 5 minutes before starting the test. A frequency of 1 Hz and an initial strain in the range of 0.002%-0.01% was used while running in non-iterative sampling mode, which enabled the instrument to adjust the strain during the test during heating. An initial torque of 1000 microN-m and a lower torque limit of 100 microN-m was used. A heating rate of 2° C./minute was used using with a nitrogen atmosphere and the test was ended at an upper temperature of 50° C. or as high as 100° C.

A temperature sweep test was run by setting the axial force adjustment mode to active compression using a load in the range from 1N to 5N. The initial temperature was set in the range from −50° C. to 0° C. depending on the glass transition temperature of the specimen and allowed to soak for up to 5 minutes before starting the test. The sample was sheared from 1-100 rad/s at an initial strain in the range of 0.001% to 0.01% and 5 data points per decade of frequency were collected. The instrument was run in non-iterative sampling mode with an initial torque of 1000 microN-m and a lower torque limit of 100 microN-m. After the frequency sweep was conducted, the temperature was increased by 5° C., allowed to equilibrate for 5 min and then repeated until reaching the final temperature, which could be as high as 60° C.

Figure 4A:
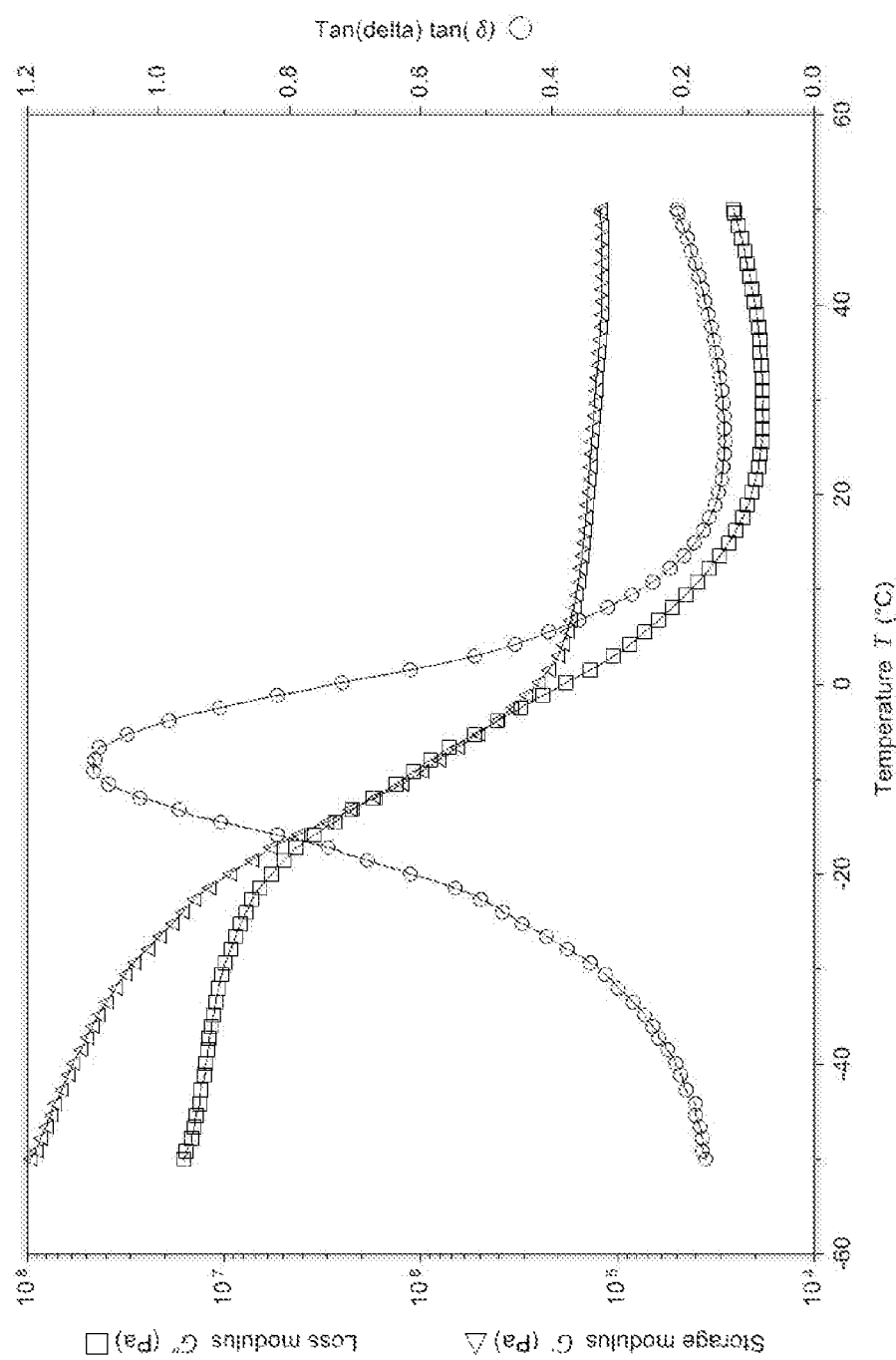
FIG. 4a shows the dynamic shear temperature ramp curve for the core middle layer of a known APVB polymer laminate showing the storage modulus (G'), loss modulus (G") and tan δ as a function of temperature.

The parallel plate fixtures and specimen were enclosed in a temperature controlled oven and two experiments (i.e., the temperature ramp test and the temperature sweep test) were performed. First, a temperature ramp experiment was conducted. In this experiment, the material was cooled to the starting temperature and then sheared in a sinusoidal fashion at a fixed frequency of 1 Hz while the temperature was increased at a heating rate of 2° C./min and the test was stopped once it reached the final temperature. During the test the instrument measures the elastic portion of the viscoelastic response, storage shear modulus (G') and the viscous portion of the response, loss shear modulus (G"). These two quantities change as a function of frequency and temperature but in this experiment, since the frequency is held constant, the temperature response of the material was measured. The ratio of the viscous to elastic portion of the response is called tan δ, which equals G"/G' and is a measure of the damping character of the polymeric material. Polymers typically exhibit a peak in tan δ at the glass transition temperature ($T_g$) where maximum damping occurs. A temperature ramp of the middle core layer of the APVB material is shown in FIG. 4a, where the oscillation frequency is 1 Hz and temperature ramp rate at 2° C./min. The tan δ peak occurs at approximately −8° C.

Figure 4B:
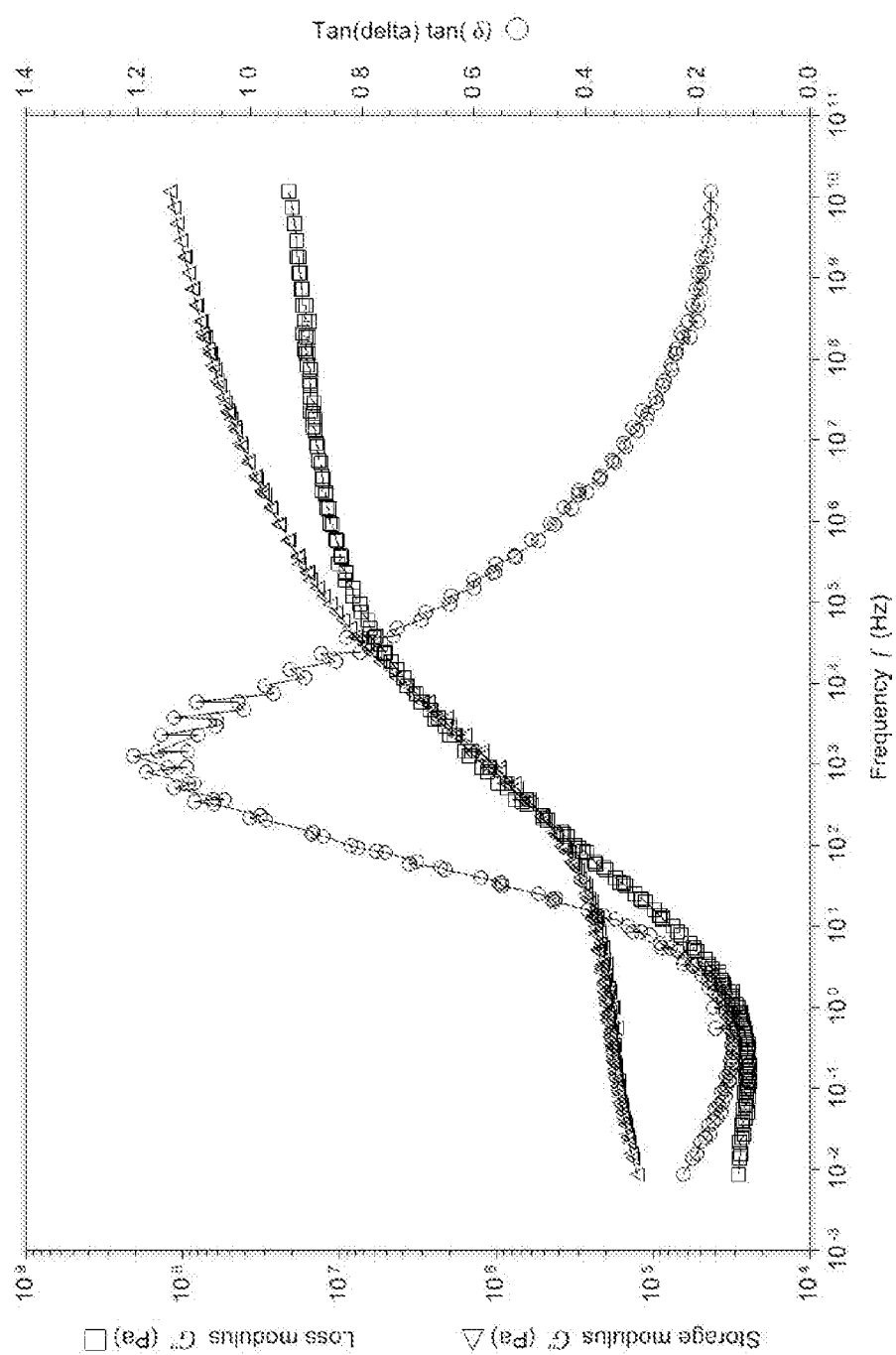
FIG. 4b shows the dynamic shear mastercurve plot of the core layer of the known APVB material, shown in FIG. 4a, as a function of frequency at a reference temperature of 20° C.

For sound transmission loss of a laminate, it is important to characterize the damping performance of the damping polymer in the frequency range of interest at the operating temperature of interest. Since the rheometer instrument cannot directly conduct measurements at frequencies of 1,000 Hz to 10,000 Hz the principle of time-temperature superposition was used to make frequency mastercurves at the desired reference operating temperature. This principle is discussed in the reference book entitled Polymer Viscoelasticity, $3^{rd}$ Ed. by J. Ferry (John Wiley & Sons, New York 1980). To make a mastercurve, a temperature sweep test is conducted where the temperature is held constant and the specimen is oscillated over a range of frequencies typically from 0.1 to 100 rad/s which can be converted to frequency in Hertz using the relationship that 1 Hz=2π rad/s.). The specimen is cooled to the initial temperature and allowed to equilibrate for at least 5 minutes. The samples are measured as a function of frequency at five frequencies per decade. The temperature is increased by 5° C., allowed to equilibrate for 5 minutes and the frequency sweep is repeated. At the end of the experiment, one data set is chosen as the reference temperature, usually a temperature near the glass transition temperature, and all the other data sets at different temperatures are connected to the data set at the reference temperature by shifting them horizontally along the x-axis by applying a multiplication factor to the frequency values, called the shift factor. The entire mastercurve itself can then be shifted to a different reference temperature desired by using the shift factors obtained by making the mastercurve. This procedure of shifting the data is called time-temperature superposition and is routinely used in polymer analysis. The mastercurve provides dynamic data (G', G", tan δ) at the reference temperature for many orders of magnitude of frequencies. It allows the user to obtain data at high frequencies (e.g. 1,000-10,000 Hz), which the instrument cannot measure directly. Ultimately, the data from the mastercurve can be used to model the sound transmission loss performance of glass/polymer laminates. A mastercurve of the core layer of acoustic PVB material (SAFLEX® QE51 manufactured by Eastman Chemical Company) is shown in FIG. 4b at a reference temperature of 20° C. The core layer was obtained by mechanically separating it from between the two outer layers of standard PVB.

The tan δ reaches a maximum value in the range of 1,000 Hz to 7,000 Hz.

Comparative Studies with Laminates

Several polymers were evaluated against the core layer of acoustic PVB and standard PVB. Tables 1-6 provide the polymers evaluated and the corresponding tan δ and G' values for each polymer. Values of tan δ and G' are taken from mastercurves constructed at a reference temperature of 20° C. and at a frequency as close to 6,300 Hz as possible (i.e. within 10%). If outside that range tan δ and G' values were an average value based on the two data points on either side of 6,300 Hz.

Table 7 provides the tan δ and G' values for standard PVB (SAFLEX® RB41 manufactured by Eastman Chemical Company) and the core layer of acoustic PVB (SAFLEX® QE51 manufactured by Eastman Chemical Company) at 20° C. and 6,300 Hz. The following materials were used to produce the polymers in Tables 1-6.

TPO is Lucirin TPO, a photoinitiator from BASF
Irgacure 651 is from BASF
PPG400DA is the diacrylate of polypropyleneglycol with an average molecular weight of 400 (M2040 supplied by Miwon)
M140 is phenoxyethylacrylate from Miwon
M142 is phenoxyethoxyethylacrylate from Miwon
M144 is phenoxyethoxyethoxyethylacrylate from Miwon
M1140* is isobornyl acrylate from Miwon
SR256 is ethoxyethoxyethylacrylate (EOEOEA) from Sartomer
M1130 is Trimethylcyclohexylacrylate (TMCHA) from Miwon
CD9075 is laurylethoxylated(4)acrylate (L(EO)$_4$A) from Sartomer
SR395 is isodecyl acrylate from Sartomer
NVC is N-Vinylcaprolactam from Sigma-Aldrich
AA is acrylic acid from Arkema
TPGDA is tripropylene glycol diacrylate from Cytec
SR440 is isooctyl acrylate from Sartomer
TEGBEH is triethyleneglycolbis(2-ethyl hexanoate) (Solusolv 2075) from Eastman Chemical Company
C17A is heptadecyl acrylate from BASF
2-PHA is 2-propylheptyl acrylate from BASF
UC102 is (1,3-butadiene, 2-methyl-homopolymer, maleated, 2-[(2-methyl-1-oxo-2-propenyl)oxy] ethyl esters) from Kurray Co.
M111 is Aronix M111 ethoxylated nonylphenolacrylate from International Specialty Chemical
ADMA is adamatylmethacrylate from Bymax
IOMP is isooctyl 3-mercaptopropionate from Sigma-Aldrich
A-189 is Silquest 189 (mercaptopropyltrimethoxysilane) from Momentive
D1173 is Darocur® 1173 from BASF
**IBOA is Ageflex isobornyl acrylate from CPS Chemical Co.

TABLE 1

| Function | Material | 1 wt % | 2 wt % | 3 wt % |
|---|---|---|---|---|
| Photoinitiator | TPO | 1 | 1 | 1 |
| Crosslinker | M2040 PPG400DA | 1 | 1 | 1 |
| Monomer 1 | | M142 P(EO)$_2$A 98 | M140 PEA 40 | M1140 IBOA* 32 |
| Monomer 2 | | — 0 | M142 P(EO)$_2$A 58 | M144 P(EO)$_4$A 66 |
| tan δ (at 20° C., 6300 Hz) | | 2.76 | 2.59 | 2.07 |
| G' (MPa) (at 20° C., 6300 Hz) | | 1.19 | 9.68 | 1.25 |

TABLE 2

| Function | Material | 4 wt % | 5 wt % | 6 wt % | 7 wt % | 8 wt % | 9 wt % | 10 wt % |
|---|---|---|---|---|---|---|---|---|
| Photoinitiator | TPO | 1 | 1 | 1 | 1 | 1 | 1 | 1 |
| Crosslinker | M2040 PPG400DA | 1 | 1 | 1 | 1 | 1 | 1 | 1 |
| Monomer 1 | | M140 PEA 52 | M140 PEA 16 | M1140 IBOA* 47 | M1140 IBOA* 38 | M1140 IBOA* 40 | M1140 IBOA* 50 | M1140 IBOA* 28 |
| Monomer 2 | | M144 P(EO)$_4$A 46 | M142 P(EO)$_2$A 82 | SR256 EOEOEA 51 | M144 P(EO)$_4$A 60 | CD9075 L(EO)$_4$A 58 | SR395 IDA 48 | M140 PEA 28 |
| Monomer 3 | | 0 | 0 | 0 | 0 | 0 | 0 | SR256 EOEOEA 42 |
| tan δ (at 20° C., 6300 Hz) | | 2.45 | 3.04 | 1.72 | | | | 2.29 |
| G' (MPa) (at 20° C., 6300 Hz) | | 9.16 | 4.47 | 19.6 | | | | 9.69 |

TABLE 3

| Function | Material | 11 wt % | 12 wt % | 13 wt % | 14 wt % | 15 wt % | 16 wt % |
|---|---|---|---|---|---|---|---|
| Photoinitiator | TPO | 1 | 1 | 1 | 1 | 1 | 1 |
| Crosslinker | M2040 PPG400DA | 1 | 1 | 1 | 1 | 1 | 1 |
| Monomer 1 | various | M1140 IBOA* 52 | M1140 IBOA* 31 | M140 PEA 26 | M1130 TMCHA 10 | M1140 IBOA* 8 | NVC 5 |
| Monomer 2 | various | CD9075 L(EO)$_4$A 46 | SR395 IDA 67 | M142 P(EO)$_2$A 72 | M142 P(EO)$_2$A 88 | M142 P(EO)$_2$A 90 | M142 P(EO)$_2$A 93 |
| tan δ (at 20° C., 6300 Hz) | | 1.93 | 2.08 | 3.18 | 2.97 | 2.93 | 2.78 |
| G' (MPa) (at 20° C., 6300 Hz) | | 6.51 | 6.12 | 5.24 | 2.93 | 2.72 | 2.92 |

TABLE 4

| Function | Material | 17 wt % | 18 wt % | 19 wt % | 20 wt % | 21 wt % | 22 wt % |
|---|---|---|---|---|---|---|---|
| Photoinitiator | TPO | 0.3 | 0.3 | 0.3 | 0.3 | 0.3 | 0.3 |
| Crosslinker | TPGDA | 0.15 | 0.15 | 0.15 | 0.15 | 0.15 | 0.15 |
| Monomer 1 | | 2-PHA 69.69 | 2-PHA 59.73 | C17A 69.69 | C17A 59.73 | AA 4.98 | AA 9.96 |
| Monomer 2 | | IBOA** 29.87 | IBOA** 39.82 | IBOA** 29.87 | IBOA** 39.82 | CD9075 L(EO)$_4$A 94.57 | SR395 IDA 89.60 |
| tan δ (at 20° C., 6300 Hz) | | 1.91 | 1.68 | 2.03 | 1.68 | 1.31 | 1.02 |
| G' (MPa) (at 20° C., 6300 Hz) | | 3.60 | 14.2 | 3.35 | 13.1 | 2.1 | 9.3 |

TABLE 5

| Function | Material | 23 wt % | 24 wt % | 25 wt % | 26 wt % | 27 wt % | 28 wt % |
|---|---|---|---|---|---|---|---|
| Photoinitiator | Irgacure 651 | 0.3 | 0 | 0.3 | 0 | 0.3 | 0.3 |
| Photoinitiator | TPO | 0 | 1 | 0 | 1 | 0 | 0 |
| Crosslinker | TPGDA | 0.15 | 0 | 0.15 | 0 | 0.15 | 0.15 |
| Crosslinker | PPG400DA | 0 | 1 | 0 | 1 | 0 | 0 |
| Plasticizer | TEGBEH | 0 | 1 | 0 | 1 | 0 | 0 |
| Monomer 1 | | AA 7.47 | AA 7.47 | IBOA** 9.96 | IBOA** 9.96 | IBOA** 14.93 | IBOA** 9.96 |
| Monomer 2 | | SR440 92.09 | SR440 92.09 | SR440 89.60 | SR440 89.60 | SR440 84.62 | SR440 84.62 |
| Monomer 3 | | 0 | 0 | 0 | 0 | 0 | AA 4.98 |
| tan δ (at 20° C., 6300 Hz) | | 1.06 | 1.13 | 1.83 | 1.72 | 2.06 | 1.42 |
| G' (MPa) (at 20° C., 6300 Hz) | | 4.01 | 3.60 | 0.64 | 0.42 | 0.91 | 4.1 |

TABLE 6

| Function | Material | 29 wt % | 30 wt % |
|---|---|---|---|
| Photoinitiator | D1173 | 5 | 5 |
| Silane Adhesion Promoter | A-189 | 3 | 3 |
| Liquid Rubber | UC102 | 35 | 35 |
| Chain Transfer Agent | IOMP | 5 | 1 |
| Monomer 1 | | M111 21 | M111 21 |
| Monomer 2 | | ADMA 31 | IBOA** 35 |
| tan δ (at 20° C., 6300 Hz) | | 1.71 | 1.41 |
| G' (MPa) (at 20° C., 6300 Hz) | | 4.0 | 4.7 |

TABLE 7

| | Standard PVB | Core Layer Acoustic PVB |
|---|---|---|
| tan δ (at 20° C., 6300 Hz) | 0.18 | 1.03 |
| G' (MPa) (at 20° C., 6300 Hz) | 209 | 3.08 |

Figure 5:
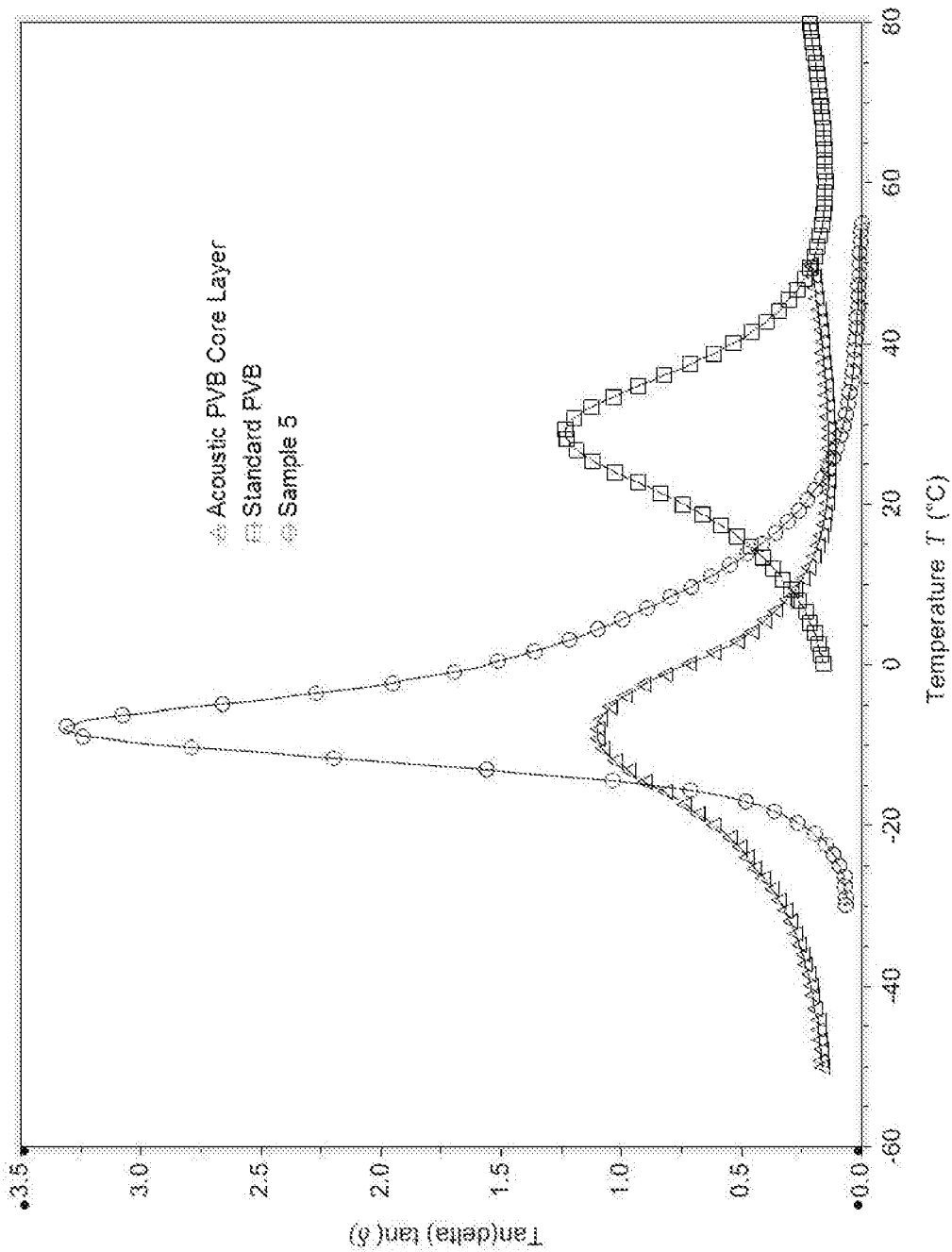
FIG. 5 shows the dynamic shear temperature ramp curves of standard known SPVB, a known APVB core layer, and a polymer according to one or more embodiments described herein.
Figure 6:
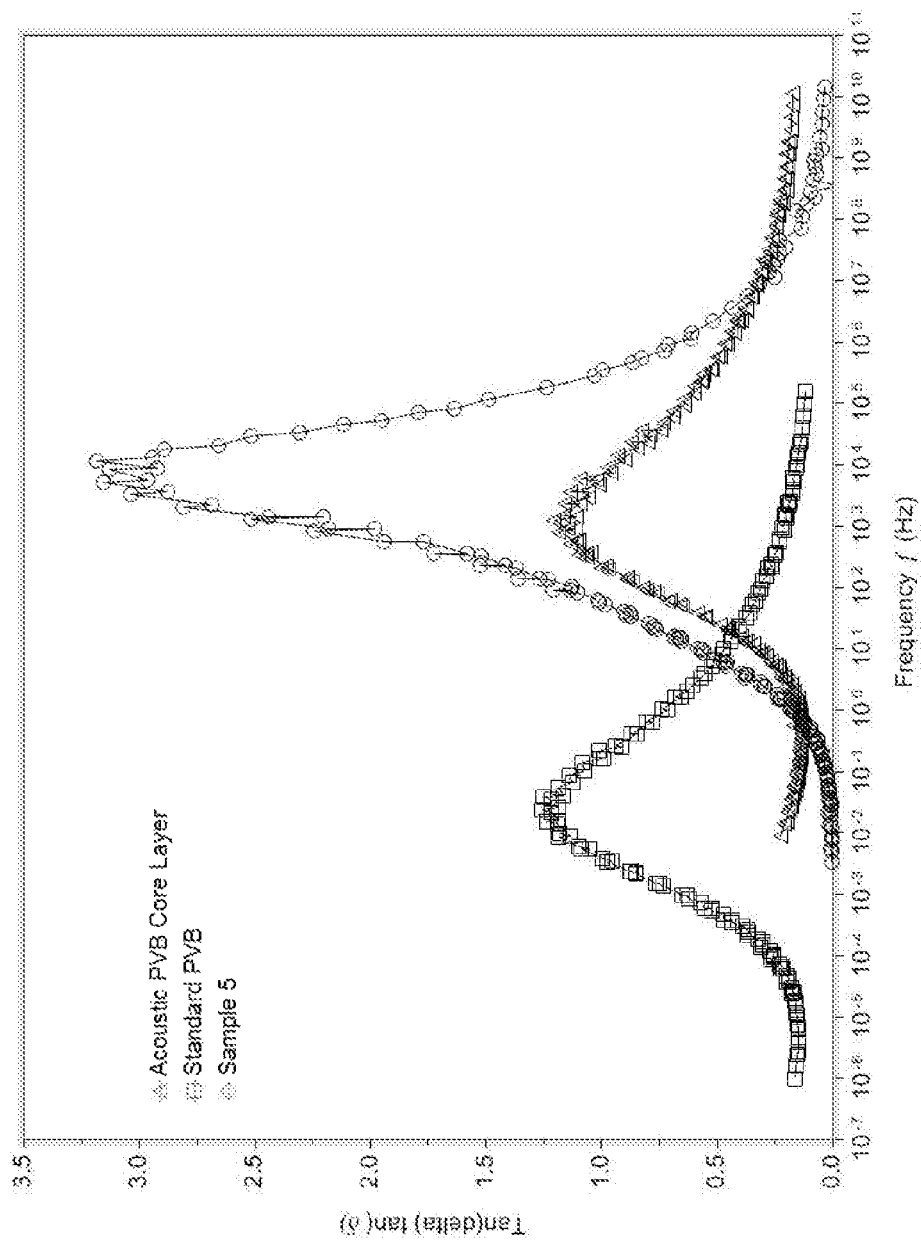
FIG. 6 shows mastercurves of the SPVB, APVB core layer and a polymer described according to one or more embodiments herein at a reference temperature of 20° C.
Figure 7:
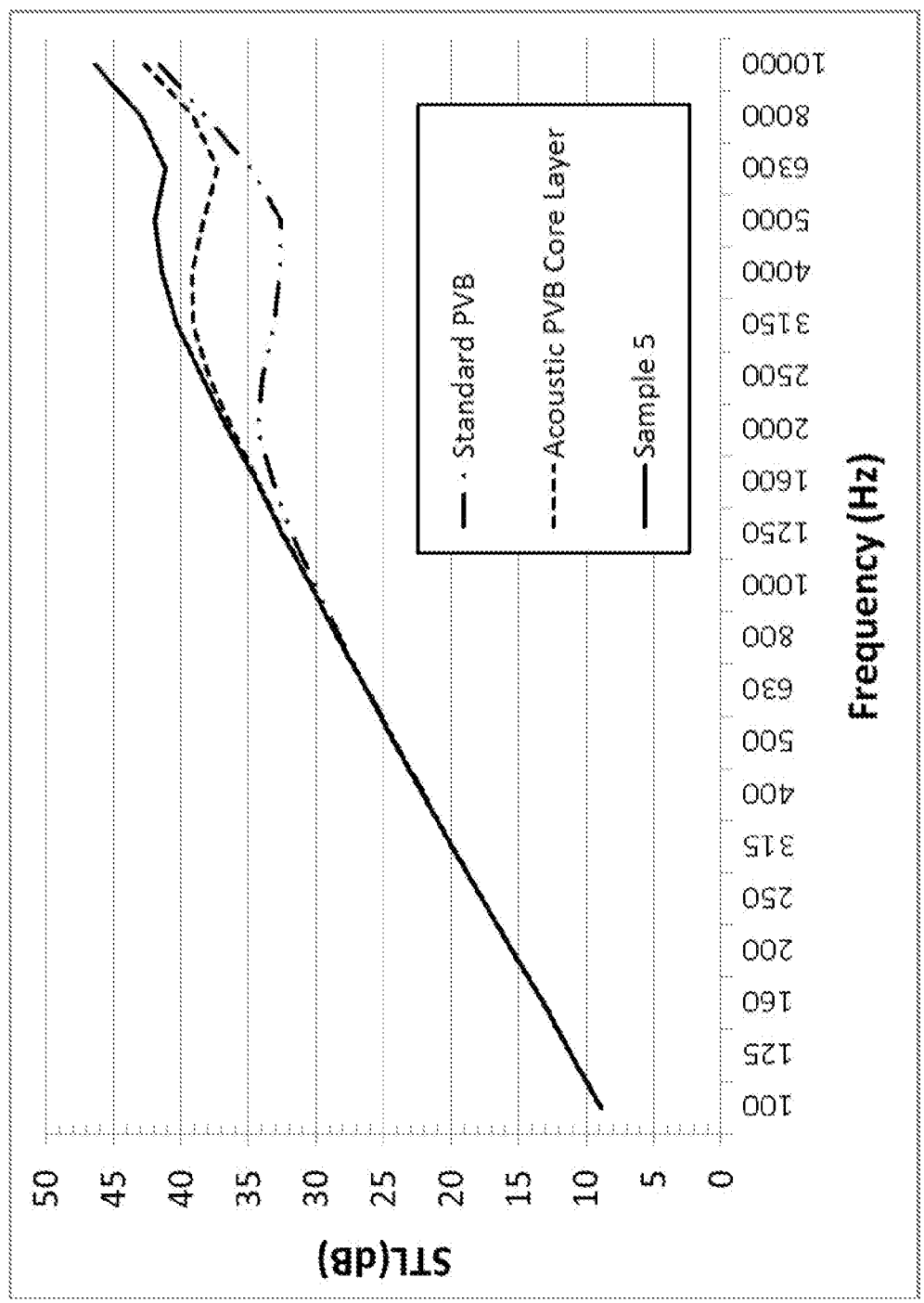
FIG. 7 shows the acoustic modeling of laminates with different damping layers.

As a non-limiting example, FIG. 5 shows the temperature ramp DMA tan δ response of the UV cured material Sample 5 (Table 2) compared to the benchmark core layer of acoustic PVB material and the standard PVB material. The peak in tan δ of Sample 5 occurs near the same temperature of the core layer of acoustic PVB material but its magnitude is much larger and therefore has much higher damping properties than the core layer of acoustic PVB material. Mastercurves of the standard PVB, core layer acoustic PVB, and Sample 5 at a reference temperature of 20° C. are shown in FIG. 6. As can be seen, Sample 5 has much higher damping than the acoustic PVB core material. The mastercurve data was used as an input to model the acoustic sound transmission loss (STL) performance of a window laminate construction of various layers and layer thicknesses shown in FIG. 7. The UV-curable Sample 5 in FIG. 5 had a significantly higher theoretical acoustic sound transmission loss due to higher damping compared to the currently used acoustic PVB material.

Figure 8:
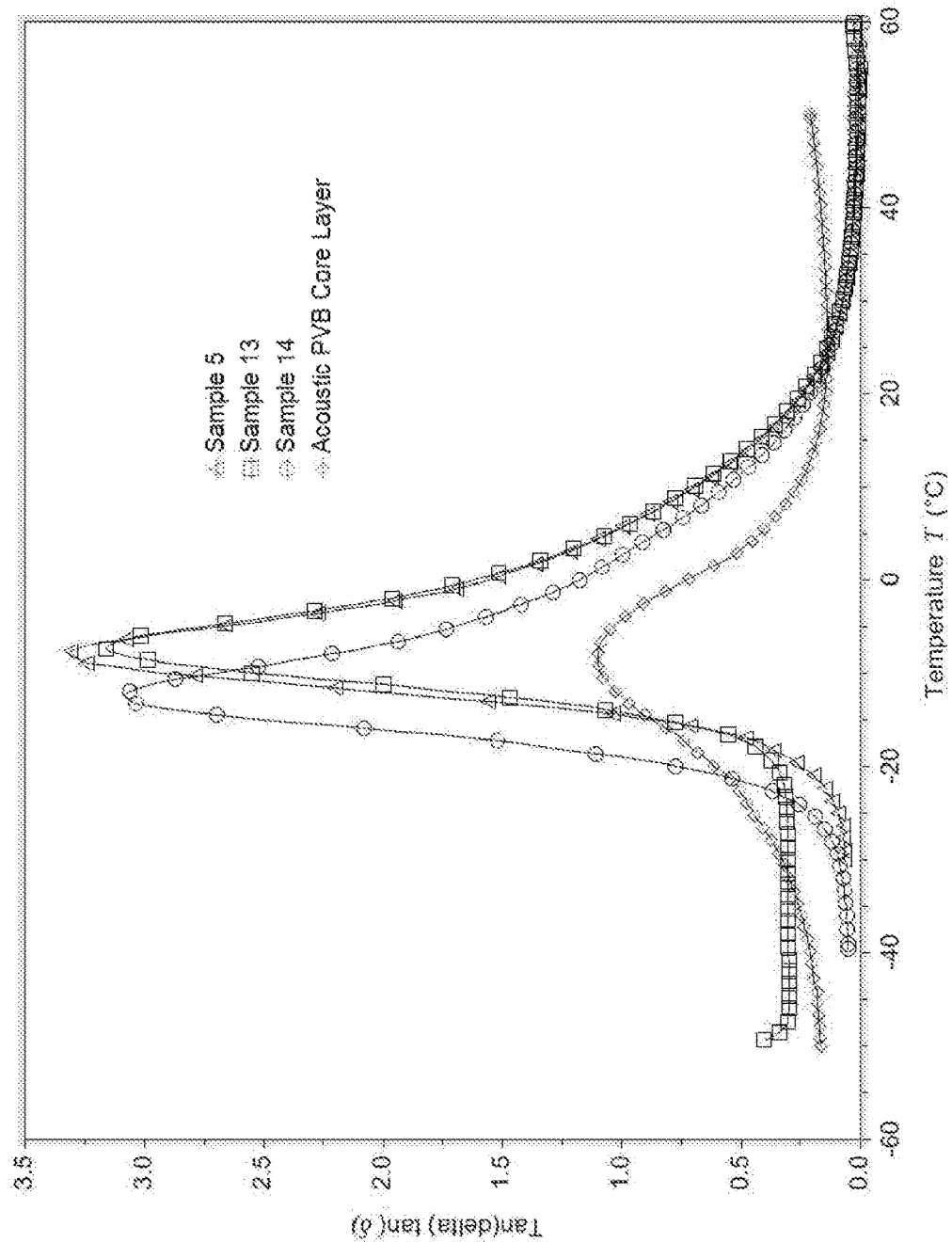
FIG. 8 shows the tan delta during a dynamic shear temperature ramp test of several polymer formulations described herein compared to a known APVB core layer.

The temperature at which the tan δ peak occurs, or Tg, can be adjusted in the formulation to better match that of the core layer of acoustic PVB. The tan δ peak of Samples 5, 13, and 14 in Tables 2 and 3 were determined and compared to the core layer of acoustic PVB, with the results in FIG. 8. As shown in FIG. 8, the tan δ peak of samples 5, 13, and 14 was significantly higher than that of acoustic PVB. Additionally, samples 5, 13, and 14 are clear once UV-cured.

Figure 9:
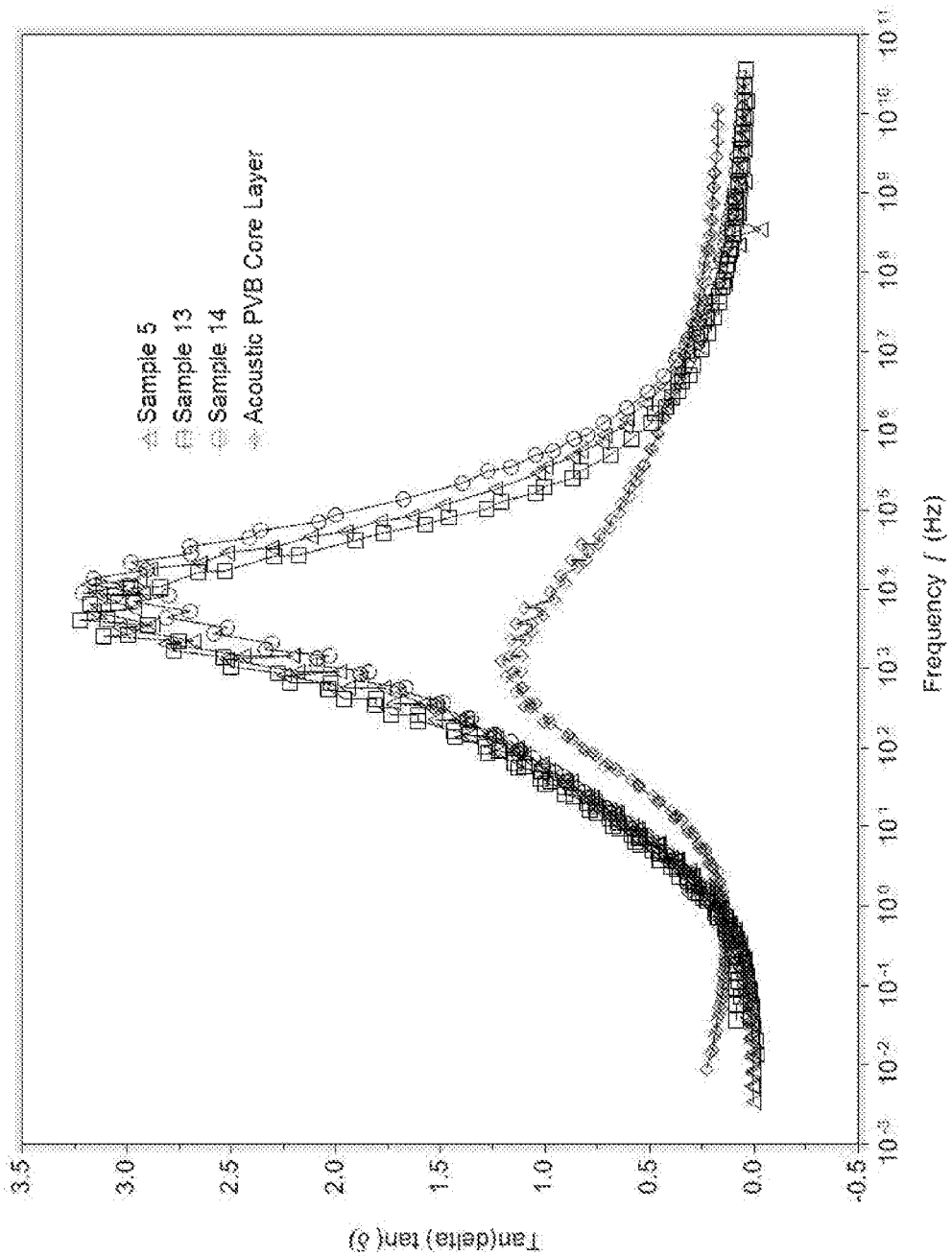
FIG. 9 shows the tan delta mastercurve at a reference temperature of 20° C. of several polymer formulations described herein compared to a known APVB core layer.

Referring to FIG. 9, samples 5, 13, and 14 had peak tan δ values near or above 3 at 20° C. over the frequency range of 1,000 Hz to 10,000 Hz. These values are substantially higher than the core layer of QE51, which is an acoustic grade of PVB (APVB) composed of two outer layers of standard PVB (approximately 0.34 mm each) and a thin layer of highly plasticized PVB (approximately 0.13 mm) in the middle.

Aspect (1) of this disclosure pertains to a laminate comprising an interlayer structure comprising a first polymer disposed between a first substrate and a second substrate, wherein the first polymer comprises a tan δ value greater than 1.0 at a temperature a range from about −20° C. to about 40° C. and a frequency in a range from about 1 Hz to about 20,000 Hz.

Aspect (2) of this disclosure pertains to the laminate according to Aspect (1), wherein the first polymer comprises a tan δ value greater than 1.0 at a temperature in a range from about −20° C. to about 40° C. when measured at mechanical frequency of 1 Hz and a heating rate of 2° C./minute.

Aspect (3) of this disclosure pertains to the laminate according to Aspect (1) or Aspect (2), wherein the first polymer comprises a glass transition temperature, as indicated by a peak in tan δ, in a range from about 0° C. to about −20° C. at a mechanical frequency of 1 Hz with a heating rate of 2° C./minute.

Aspect (4) of this disclosure pertains to the laminate according to any one or more of Aspect (1) through Aspect (3), wherein the first polymer comprises a tan δ value greater than 1.0 at a temperature of 20° C. at a frequency in a range from about 1,000 Hz to about 20,000 Hz.

Aspect (5) of this disclosure pertains to the laminate according to any one or more of Aspect (1) through Aspect (4), wherein the first polymer comprises a tan δ value greater than 2.0 at a temperature in a range from about −20° C. to about 40° C. when measured at mechanical frequency of 1 Hz and a heating rate of 2° C./min.

Aspect (6) of this disclosure pertains to the laminate according to any one or more of Aspect (1) through Aspect (5), wherein the first polymer comprises a tan δ value in a range from about 2.0 to about 4.0 at a temperature in a range from about −20° C. to about 40° C. when measured at mechanical frequency of 1 Hz and a heating rate of 2° C./min.

Aspect (7) of this disclosure pertains to the laminate according to any one or more of Aspect (1) through Aspect (6), wherein the first polymer comprises a tan δ value in a range from about 2.0 to about 4.0 at a temperature in a range from about −20° C. to about 40° C. and at a frequency in a range from about 1,000 Hz to about 20,000 Hz.

Aspect (8) of this disclosure pertains to the laminate according to any one or more of Aspect (1) through Aspect (4), wherein the first polymer has a tan δ value greater than 1.25 at 20° C. and at all frequencies in a range from about 100 Hz to about 100,000 Hz.

Aspect (9) of this disclosure pertains to a laminate comprising an interlayer structure comprising a first polymer disposed between a first substrate and a second substrate, wherein the first polymer has a tan δ value greater than a core layer of an acoustic PVB within a frequency range of 1 Hz to 20,000 Hz.

Aspect (10) pertains to the laminate of Aspect (9), wherein the first polymer has a tan δ value that is 1.2 to 4 times greater than the core layer of the acoustic PVB within a frequency range of 1,000 Hz to 20,000 Hz.

Aspect (11) pertains to the laminate of Aspect (9) or Aspect (10), wherein the first polymer is produced by the polymerization of one or more ethylenically unsaturated compounds.

Aspect (12) of this disclosure pertains to the laminate according to any one or more of Aspect (1) through Aspect (10), wherein the first polymer is produced by the polymerization of one or more monomers comprising an allyl compound, a vinyl compound, an acrylate, a methacrylate, an acrylamide, or a methacrylamide, or any combination thereof Aspect (13) of this disclosure pertains to the laminate according to any one or more of Aspect (1) through Aspect (10), wherein the first polymer is the polymerization product of two or more acrylate monomers.

Aspect (14) of this disclosure pertains to the laminate according to any one or more of Aspect (1) through Aspect (10), wherein the first constituent and second constituent are selected from the group consisting of ethoxylated nonylphenolacrylate, phenoxyethoxyethylacrylate, phenoxyethylacrylate, trimethylcyclohexylacrylate, isobornyl acrylate, phenoxyethoxyethoxyethoxyethylacrylate, ethoxyethoxyethylacrylate, isooctyl acrylate, laurylethoxylated(4)acrylate, isodecyl acrylate, ethoxyethoxyethylacrylate, N-vinylcaprolactam, 2-propylheptyl acrylate, heptadecyl acrylate, acrylic acid, isobornyl acrylate, and adamatylmethacrylate.

Aspect (15) of this disclosure pertains to the laminate according to any one or more of Aspect (1) through Aspect (10), wherein the first polymer is further at least partially crosslinked with a crosslinking agent.

Aspect (16) of this disclosure pertains to the laminate according to Aspect (15), wherein the crosslinking agent is a diacrylate compound or dimethacrylate compound.

Aspect (17) of this disclosure pertains to the laminate according to Aspect (15), wherein the crosslinking agent is a polyalkylene oxide diacrylate compound or a polyalkylene oxide dimethacrylate compound.

Aspect (18) of this disclosure pertains to the laminate according to Aspect (15), wherein the crosslinking agent is an oligo-propylene glycol diacrylate.

Aspect (19) of this disclosure pertains to the laminate according to any one or more of Aspect (1) through Aspect (18), wherein the interlayer structure comprises a first layer and a second layer, wherein the first layer comprises the first polymer.

Aspect (20) of this disclosure pertains to the laminate according to any one or more of Aspect (1) through Aspect (19), wherein the first layer is disposed between a second layer and a third layer.

Aspect (21) of this disclosure pertains to the laminate according to Aspect (19) or Aspect (20), wherein the second layer and the third layer comprise the same polymeric material.

Aspect (22) of this disclosure pertains to the laminate according to Aspect (19) or Aspect (20), wherein the second layer and the third layer comprise different polymeric materials from one another.

Aspect (23) of this disclosure pertains to the laminate according to any one or more of Aspect (19) through Aspect (22), wherein either one or both of the second layer and the third layer comprise a polymeric material selected from the group consisting of polyvinyl butyral (PVB), ethylene-vinyl acetate (EVA) and thermoplastic polyurethane (TPU), polyester (PE), and polyethylene terephthalate (PET).

Aspect (24) of this disclosure pertains to the laminate according to any one or more of Aspect (19) through Aspect (23), wherein the second layer and the third layer comprise polyvinyl butyral (PVB).

Aspect (25) of this disclosure pertains to the laminate according to any one or more of Aspect (1) through Aspect (24), wherein the first substrate has a thickness of 2.1 mm or less.

Aspect (26) of this disclosure pertains to the laminate according to any one or more of Aspect (1) through Aspect (24), wherein the first substrate has a thickness in the range from about 1.6 mm to about 4 mm.

Aspect (27) of this disclosure pertains to the laminate according to any one or more of Aspect (1) through Aspect (26), wherein the first substrate comprises an unstrengthened glass.

Aspect (28) of this disclosure pertains to the laminate according to any one or more of Aspect (1) through Aspect (27), wherein the first substrate comprises soda lime glass.

Aspect (29) of this disclosure pertains to the laminate according to any one or more of Aspect (1) through Aspect (26) and Aspect (28), wherein the first substrate comprises a strengthened glass.

Aspect (30) of this disclosure pertains to the laminate according to any one or more of Aspect (1) through Aspect (29), wherein the second substrate has a thickness less than the thickness of the first substrate.

Aspect (31) of this disclosure pertains to the laminate according to any one or more of Aspect (1) through Aspect (30), wherein the second substrate comprises a strengthened glass.

Aspect (32) of this disclosure pertains to the laminate according Aspect (30), wherein the second substrate exhibits a compressive stress in the range from about 50 MPa to about 800 MPa and a depth of compression in the range from about 35 micrometers to about 200 micrometers.

Aspect (33) of this disclosure pertains to the laminate according to any one or more of Aspect (1) through Aspect (32), wherein the first substrate has a thickness and the ratio of the thickness of the second substrate to the thickness of the first substrate is greater than about 0.33.

Aspect (34) of this disclosure pertains to the laminate according to any one or more of Aspect (1) through Aspect (33), wherein the ratio of the thickness of the second substrate to the thickness of the first substrate is about 0.39 or greater.

Aspect (35) of this disclosure pertains to the laminate according to any one or more of Aspect (1) through Aspect (34), wherein the ratio of the thickness of the second substrate to the thickness of the first substrate is about 0.5 or greater.

Aspect (36) of this disclosure pertains to the laminate according to any one or more of Aspect (1) through Aspect (35), wherein the first polymer comprises an average transmittance of greater than 80%, over a wavelength range from about 400 nm to about 700 nm, at a first polymer thickness of 1 mm.

Aspect (37) of this disclosure pertains to the laminate according to any one or more of Aspect (1) through Aspect (36), wherein the laminate comprises an average transmittance of greater than 80%, over a wavelength range from about 400 nm to about 700 nm, at any one or more of the thicknesses described herein.

Aspect (38) of this disclosure pertains to the laminate according to any one or more of Aspect (1) through Aspect (37), wherein the laminate has a sound transmission loss of transmission loss of greater than about 38 dB over a frequency range from about 2500 Hz to about 6000 Hz.

Aspect (39) of this disclosure pertains to a vehicle comprising a body, an opening and the laminate of any one or more of Aspect (1) through Aspect (38) disposed in the opening.

Aspect (40) of this disclosure pertains to the vehicle of Aspect (39) wherein the body comprises an automobile, a railcar, aircraft or seacraft.

Aspect (41) of this disclosure pertains to an architectural panel comprising the laminate of any one or more of Aspect (1) through Aspect (40), wherein the panel comprises a window, an interior wall panel, a modular furniture panel, a backsplash, a cabinet panel, or an appliance panel.

Aspect (42) of this disclosure pertains to a polymer comprising a polymerization product of a first constituent and a second constituent, wherein the first constituent and second constituent are selected from the group consisting of ethoxylated nonylphenolacrylate, phenoxyethoxyethylacrylate, phenoxyethylacrylate, Trimethylcyclohexylacrylate, isobornyl acrylate, phenoxyethoxyethoxyethylacrylate, ethoxyethoxyethylacrylate, isooctyl acrylate, laurylethoxylated(4)acrylate, isodecyl acrylate, ethoxyethoxyethylacrylate, N-Vinylcaprolactam, 2-propylheptyl acrylate, heptadecyl acrylate, acrylic acid, isobornyl acrylate, and adamatylmethacrylate, wherein the first constituent and the second constituent are not the same.

Aspect (43) of this disclosure pertains to the polymer of Aspect (42), wherein the polymer comprises a polymerization product comprises a third constituent, wherein the third constituent is selected from the group consisting of ethoxylated nonylphenolacrylate, phenoxyethoxyethylacrylate, phenoxyethylacrylate, Trimethylcyclohexylacrylate, isobornyl acrylate, phenoxyethoxyethoxyethoxyethylacrylate, ethoxyethoxyethylacrylate, isooctyl acrylate, laurylethoxylated(4)acrylate, isodecyl acrylate, ethoxyethoxyethylacrylate, N-Vinylcaprolactam, 2-propylheptyl acrylate, heptadecyl acrylate, acrylic acid, isobornyl acrylate, and adamatylmethacrylate, wherein the third constituent is not the same as the first and the second constituent.

Aspect (44) of this disclosure pertains to the polymer of any one or more of Aspect (42) and Aspect (43), wherein the first constituent comprises phenoxyethylacrylate and the second constituent comprises phenoxyethoxyethylacrylate.

Aspect (45) of this disclosure pertains to the polymer of any one or more of Aspect (42) and Aspect (43), wherein the first constituent comprises isobornyl acrylate or phenoxyethylacrylate, and the second constituent comprises phenoxyethoxyethoxyethoxyethylacrylate.

Aspect (46) of this disclosure pertains to the polymer of any one or more of Aspect (42) and Aspect (43), wherein the first constituent comprises phenoxyethylacrylate and the second constituent comprises phenoxyethoxyethylacrylate.

Aspect (47) of this disclosure pertains to the polymer of any one or more of Aspect (42) and Aspect (43), wherein the first constituent comprises isobornyl acrylate and the second constituent comprises ethoxyethoxyethylacrylate, phenoxyethoxyethoxyethoxyethylacrylate, phenoxyethoxyethylacrylate isodecyl acrylate, isooctyl acrylate or laurylethoxylated (4)acrylate.

Aspect (48) of this disclosure pertains to the polymer of any one or more of Aspect (42) and Aspect (43), wherein the first constituent comprises isobornyl acrylate, the second constituent comprises phenoxyethylacrylate, and the third constituent comprises ethoxyethoxyethylacrylate.

Aspect (49) of this disclosure pertains to the polymer of any one or more of Aspect (42) and Aspect (43), wherein the first constituent comprises trimethylcyclohexylacrylate and the second constituent comprises phenoxyethoxyethylacrylate.

Aspect (50) of this disclosure pertains to the polymer of any one or more of Aspect (42) and Aspect (43), wherein the first constituent comprises N-Vinylcaprolactam and the second constituent comprises phenoxyethoxyethylacrylate.

Aspect (51) of this disclosure pertains to the polymer of any one or more of Aspect (42) and Aspect (43), wherein the first constituent comprises 2-propylheptyl acrylate or heptadecyl acrylate, and the second constituent comprises isobornyl acrylate.

Aspect (52) of this disclosure pertains to the polymer of any one or more of Aspect (42) and Aspect (43), wherein the first constituent comprises acrylic acid and the second constituent comprises laurylethoxylated(4)acrylate, or isodecyl acrylate.

Aspect (53) of this disclosure pertains to the polymer of Aspect (43), wherein the first constituent comprises isobornyl acrylate, the second constituent comprises isooctyl, and the third constituent comprises acrylic acid.

Aspect (54) of this disclosure pertains to the polymer of Aspect (43), wherein the first constituent comprises ethoxylated nonylphenolacrylate, and the second constituent comprises adamatylmethacrylate or isobornyl acrylate Aspect (55) of this disclosure pertains to the polymer of any one or more of Aspect (42) through Aspect (54), wherein the polymer is at least partially crosslinked with a crosslinking agent.

Aspect (56) of this disclosure pertains to a laminate comprising an interlayer structure comprising a first polymer disposed between a first substrate and a second substrate, wherein the first polymer is produced by the polymerization of one or more ethylenically unsaturated compounds, wherein the laminate exhibits a sound transmission loss of greater than about 38 dB over a frequency range from about 2500 Hz to about 6000 Hz.

Aspect (57) of this disclosure pertains to the laminate of Aspect (56), wherein the first polymer is produced by the polymerization of one or more monomers comprising an allyl compound, a vinyl compound, an acrylate, a methacrylate, an acrylamide, or a methacrylamide, or any combination thereof Aspect (58) of this disclosure pertains to the laminate of any one or more Aspect (56) and Aspect (57), wherein the first polymer is the polymerization product of two or more acrylate monomers.

Aspect (59) of this disclosure pertains to the laminate of any one or more of Aspect (56) through Aspect (58), wherein the first polymer is at least partially crosslinked with a crosslinking agent.

Aspect (60) of this disclosure pertains to the laminate of any one or more of Aspect (56) through Aspect (59), wherein the first substrate has a thickness of 2.1 mm or less.

Aspect (61) of this disclosure pertains to the laminate of any one or more of Aspect (56) through Aspect (60), wherein the first substrate has a thickness in the range from about 1.6 mm to about 4 mm.

Aspect (62) of this disclosure pertains to the laminate of any one or more of Aspect (56) through Aspect (61), wherein the first substrate comprises an unstrengthened glass.

Aspect (63) of this disclosure pertains to the laminate of any one or more of Aspect (56) through Aspect (62), wherein the first substrate comprises soda lime glass.

Aspect (64) of this disclosure pertains to the laminate of any one or more of Aspect (56 through Aspect (61) and Aspect (63), wherein the first substrate comprises a strengthened glass.

Aspect (65) of this disclosure pertains to the laminate of any one or more of Aspect (56) through Aspect (64), wherein the second substrate has a thickness less than the thickness of the first substrate.

Aspect (66) of this disclosure pertains to the laminate of any one or more of Aspect (56) through Aspect (65), wherein the second substrate comprises a strengthened glass.

Aspect (67) of this disclosure pertains to the laminate of Aspect (66), wherein the second substrate exhibits a compressive stress in the range from about 50 MPa to about 800 MPa and a depth of compression in the range from about 35 micrometers to about 200 micrometers.

Aspect (68) of this disclosure pertains to the laminate of any one or more of Aspect (56) through Aspect (67), wherein the first substrate has a thickness and the ratio of the thickness of the second substrate to the thickness of the first substrate is greater than about 0.33.

Aspect (69) of this disclosure pertains to the laminate of any one or more of Aspect (56) through Aspect (68), wherein the ratio of the thickness of the second substrate to the thickness of the first substrate is about 0.39 or greater.

Aspect (70) of this disclosure pertains to the laminate of any one or more of Aspect (56) through Aspect (69), wherein the ratio of the thickness of the second substrate to the thickness of the first substrate is about 0.5 or greater.

Aspect (71) of this disclosure pertains to the laminate of any one or more of Aspect (56) through Aspect (70), wherein the first polymer exhibits an average transmittance of greater than 80%, over a wavelength range from about 400 nm to about 700 nm, at a first polymer thickness of 1 mm.

Aspect (72) of this disclosure pertains to the laminate of any one or more of Aspect (56) through Aspect (71), wherein the laminate exhibits an average transmittance of greater than 80%, over a wavelength range from about 400 nm to about 700 nm, at any one or more of the thicknesses described herein.

Aspect (73) pertains to a vehicle comprising a body, an opening and the laminate of any one or more of Aspect (56) through Aspect (72), disposed in the opening Aspect (74) pertains to the vehicle of Aspect (73), wherein the body comprises an automobile, a railcar, aircraft or seacraft.

Aspect (75) pertains to an architectural panel comprising the laminate of any one or more of Aspect (56) through Aspect (72), wherein the panel comprises a window, an interior wall panel, a modular furniture panel, a backsplash, a cabinet panel, or an appliance panel.

Throughout this application, various publications are referenced. The disclosures of these publications in their entireties are hereby incorporated by reference into this application in order to more fully describe the methods and articles described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A laminate comprising an interlayer structure, wherein a first polymer layer is disposed between a first substrate and a second substrate, wherein the first polymer has a tan δ value greater than 1.0 at a temperature in a range from −20° C. to about 40° C. and a frequency in a range from about 1 Hz to about 20,000 Hz, wherein the first polymer is the polymerization product of a first constituent and a second constituent with an optional crosslinking agent, initiator, or combination thereof, wherein the first constituent is one or more compounds having the structure I

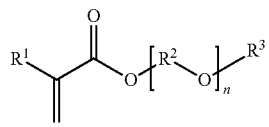

wherein $R^1$ is hydrogen or an alkyl group;
$R^2$ is an alkylene group;
$R^3$ is an alkyl group, a cycloalkyl group, or an unsubstituted aryl group; and
n is from 1 to 20, and the second constituent is selected from the group consisting of lauryl acrylate, laurylethoxylated(4) acrylate, 2-propylheptyl acrylate, ethoxylatednonylphenol acrylate, caprolactone acrylate, isooctyl acrylate, tridecylacrylate, phenoxyglycidyl acrylate, lauryloxyglycidyl acrylate, isobornyl acrylate, tetrahydrofurfuryl acrylate, stearyl acrylate, isodecyl acrylate, trimethylcyclohexylacrylate, adamatylmethacrylate, N-vinylcaprolactam, cyclic trimethylolpropane formal acrylate, tetrahydrofurfuryl acrylate, or any combination thereof.

2. The laminate of claim 1, wherein the first polymer has a tan δ value greater than 1.0 at a temperature in a range from about −20° C. to about 40° C. when measured at mechanical frequency of 1 Hz and a heating rate of 2° C/minute.

3. The laminate of claim 1, wherein the first polymer has a glass transition temperature, as indicated by a peak in tan δ, in a range from about 0° C. to about −20° C. at a mechanical frequency of 1 Hz with a heating rate of 2° C./minute.

4. The laminate of claim 1, wherein the first polymer has a tan δ value greater than 1.0 at a temperature of 20° C. at a frequency in a range from about 1,000 Hz to about 20,000 Hz.

5. The laminate of claim 1, wherein the first polymer has a tan δ value greater than 2.0 at a temperature in a range from about −20° C. to about 40° C. when measured at mechanical frequency of 1 Hz and a heating rate of 2° C./min.

6. The laminate of claim 1, wherein the first polymer has a tan δ value in a range from about 2.0 to about 4.0 at a temperature in a range from about −20° C. to about 40° C. when measured at mechanical frequency of 1 Hz and a heating rate of 2° C./min.

7. The laminate of claim 1, wherein the first polymer has a tan δ value in a range from about 2.0 to about 4.0 at a temperature in a range from about −20° C. to about 40° C. and at a frequency in a range from about 1,000 Hz to about 20,000 Hz.

8. The laminate of claim 1, wherein the first polymer has a tan δ value greater than 1.25 at 20° C. and at all frequencies in a range from about 100 Hz to about 10,000 Hz.

9. The laminate of claim 1, wherein the first constituent is selected from the group consisting of phenoxyethoxyethylacrylate, phenoxyethylacrylate, phenoxyethoxyethoxyethoxyethylacrylate, or ethoxyethoxyethylacrylate.

10. The laminate of claim 1, wherein $R^1$ is hydrogen and $R^2$ is ethylene.

11. The laminate of claim 1, wherein $R^1$ is hydrogen, $R^2$ is ethylene, and $R^3$ is the unsubstitued aryl group.

12. The laminate of claim 1, wherein $R^1$ is hydrogen, $R^2$ is ethylene, $R^3$ is a unsubstituted phenyl group, and n is from 1 to 10.

13. The laminate of claim 1, wherein the first constituent is phenoxyethoxyethylacrylate, phenoxyethoxyethoxyethylacrylate, or a combination thereof.

14. The laminate of claim 1, wherein the first polymer is further at least partially crosslinked with a crosslinking agent.

15. The laminate of claim 1, wherein the interlayer structure comprises the first layer and a second layer.

16. The laminate of claim 1, wherein the interlayer structure comprises the first layer disposed between a second layer and a third layer.

17. The laminate of claim 16, wherein the second layer and the third layer comprise the same polymeric material.

18. The laminate of claim 16, wherein the second layer and the third layer comprise different polymeric materials from one another.

19. The laminate of claim 16, wherein either one or both of the second layer and the third layer comprise a polymeric material selected from the group consisting of polyvinyl butyral (PVB), ethylene-vinyl acetate (EVA) and thermoplastic polyurethane (TPU), polyester (PE), and polyethylene terephthalate (PET).

20. The laminate of claim 16, wherein the second layer and the third layer comprise polyvinyl butyral (PVB).

21. The laminate of claim 1, wherein the first substrate has a thickness of 2.1 mm or less.

22. The laminate of claim 1, wherein the first substrate has a thickness in the range from about 1.6 mm to about 4 mm.

23. The laminate of claim 1, wherein the first substrate comprises an unstrengthened glass.

24. The laminate of claim 1, wherein the first substrate comprises soda lime glass.

25. The laminate of claim 1, wherein the first substrate comprises a strengthened glass.

26. The laminate of claim 1, wherein the second substrate has a thickness less than the thickness of the first substrate.

27. The laminate of claim 1, wherein the second substrate comprises a strengthened glass.

28. The laminate of claim 27, wherein the second substrate exhibits a compressive stress in the range from about 50 MPa to about 800 MPa and a depth of compression in the range from about 35 micrometers to about 200 micrometers.

29. The laminate of claim 1, wherein the first polymer exhibits an average transmittance of greater than 80%, over a wavelength range from about 400 nm to about 700 nm, at a first polymer thickness of 1 mm.

30. The laminate of claim 1, wherein the laminate exhibits an average transmittance of greater than 80%, over a wavelength range from about 400 nm to about 700 nm.

31. The laminate of claim 1, wherein the laminate has a sound transmission loss of greater than about 38 dB over a frequency range from about 2500 Hz to about 6000 Hz.

32. A vehicle comprising a body, an opening and the laminate of claim 1 disposed in the opening.

33. The vehicle of claim 32, wherein the body comprises an automobile body, a railcar body, or an airplane body.

34. A laminate comprising an interlayer structure, wherein a first polymer layer is disposed between a first substrate and a second substrate, wherein the laminate exhibits a sound transmission loss of greater than about 38 dB over a frequency range from about 2500 Hz to about 6000 Hz, and wherein the first polymer is the polymerization product of a first constituent and a second constituent with an optional crosslinking agent, initiator, or combination thereof, wherein the first constituent is one or more compounds having the structure I

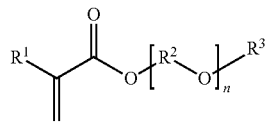

wherein $R^1$ is hydrogen or an alkyl group;
$R^2$ is an alkylene group;
$R^3$ is an alkyl group, a cycloalkyl group, or an unsubstituted aryl group; and
n is from 1 to 20, and
the second constituent is selected from the group consisting of lauryl acrylate, lauryiethoxylated(4) acrylate, 2-propylheptyl acrylate, ethoxylatednonylphenol acrylate, caprolactone acrylate, isooctyl acrylate, tridecylacrylate, phenoxyglycidyl acrylate, lauryloxyglycidyl acrylate, isobornyl acrylate, tetrahydrofurfuryl acrylate, stearyl acryldate, isodecyl acrylate, trimethylcyclohexylacrylate, adamatylmethacrylate, N-vinylcaprolactam, cyclic trimethylolpropane formal acrylate, tetrahydrofurfuryl acrylate, or any combination thereof.

35. The laminate of claim 34, wherein $R^1$ is hydrogen and $R^2$ is ethylene.

36. The laminate of claim 34, wherein $R^1$ is hydrogen, $R^2$ is ethylene, and $R^3$ is the unsubstituted aryl group.

37. The laminate of claim 34, wherein $R^1$ is hydrogen, $R^2$ is ethylene, $R^3$ is a unsubstituted phenyl group, and n is from 1 to 10.

38. The laminate of claim 34, wherein the first constituent is phenoxyethoxyethylacrylate, phenoxyethoxyethoxyethylacrylate, or a combination thereof.

39. The laminate of claim 34, wherein the first polymer is at least partially crosslinked with a crosslinking agent.

40. The laminate of claim 34, wherein the first substrate has a thickness of 2.1 mm or less.

41. The laminate of claim 34, wherein the first substrate has a thickness in the range from about 1.6 mm to about 4 mm.

42. The laminate of claim 34, wherein the first substrate comprises an unstrengthened glass.

43. The laminate of claim 34, wherein the first substrate comprises soda lime glass.

44. The laminate of claim 34, wherein the first substrate comprises a strengthened glass.

45. The laminate of claim 34, wherein the second substrate has a thickness less than the thickness of the first substrate.

46. The laminate of claim 34, wherein the second substrate comprises a strengthened glass.

47. The laminate of claim 46, wherein the second substrate exhibits a compressive stress in the range from about 50 MPa to about 800 MPa and a depth of compression in the range from about 35 micrometers to about 200 micrometers.

48. The laminate of claim 34, wherein the first polymer exhibits an average transmittance of greater than 80%, over a wavelength range from about 400 nm to about 700 nm, at a first polymer thickness of 1 mm.

49. A vehicle comprising a body, an opening and the laminate of claim 34 disposed in the opening.

50. An architectural panel comprising the laminate of claim 34, wherein the panel comprises a window, an interior wall panel, a modular furniture panel, a backsplash, a cabinet panel, or an appliance panel.

* * * * *

UNITED STATES PATENT AND TRADEMARK OFFICE
CERTIFICATE OF CORRECTION

PATENT NO.        : 10,350,861 B2
APPLICATION NO.   : 15/219664
DATED             : July 16, 2019
INVENTOR(S)       : Michael Edward DeRosa et al.

It is certified that error appears in the above-identified patent and that said Letters Patent is hereby corrected as shown below:

In the Claims

In Column 40, Line 48, Claim 11, delete "the unsubstitued" and insert -- the unsubstituted --, therefor.

In Column 42, Line 7, Claim 34, delete "lauryiethoxylated" and insert -- laurylethoxylated --, therefor.

In Column 42, Line 12, Claim 34, delete "acyldate," and insert -- acrylate, --, therefor.

Signed and Sealed this
Thirty-first Day of December, 2019

Andrei Iancu
*Director of the United States Patent and Trademark Office*